United States Patent
Wang et al.

(10) Patent No.: US 10,299,164 B2
(45) Date of Patent: May 21, 2019

(54) PROTOCOL STACK ADAPTATION METHOD AND APPARATUS

(71) Applicant: Huawei Technologies Co., Ltd., Shenzhen (CN)

(72) Inventors: Enbo Wang, Shanghai (CN); Chenghui Peng, Munich (DE); Qiyong Zhao, Shanghai (CN); Bin Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 15/362,475

(22) Filed: Nov. 28, 2016

(65) Prior Publication Data

US 2017/0078917 A1 Mar. 16, 2017

Related U.S. Application Data

(63) Continuation of application No. PCT/CN2014/078585, filed on May 28, 2014.

(51) Int. Cl.
*H04W 28/06* (2009.01)
*H04L 29/06* (2006.01)
(Continued)

(52) U.S. Cl.
CPC ....... *H04W 28/065* (2013.01); *H04L 12/4633* (2013.01); *H04L 29/06* (2013.01);
(Continued)

(58) Field of Classification Search
CPC ..... H04L 12/4633; H04L 29/06; H04L 69/04; H04L 69/16; H04L 69/18; H04L 69/22;
(Continued)

(56) References Cited

U.S. PATENT DOCUMENTS

| 6,839,339 B1 | 1/2005 | Chuah |
|---|---|---|
| 8,516,158 B1 | 8/2013 | Wu et al. |

(Continued)

FOREIGN PATENT DOCUMENTS

| CN | 101252598 A | 8/2008 |
|---|---|---|
| CN | 101350812 A | 1/2009 |

(Continued)

OTHER PUBLICATIONS

"$3^{rd}$ Generation Partnership Project; Technical Specification Group Radio Access Network; Packet Data Convergence Protocol (PDCP) specification (Release 11)," 3GPP TS 25.323, V11.0.0, pp. 1-43, $3^{rd}$ Generation Partnership Project, Valbonne, France (Sep. 2012).

(Continued)

*Primary Examiner* — Robert J Lopata
(74) *Attorney, Agent, or Firm* — Leydig, Voit & Mayer, Ltd.

(57) ABSTRACT

Disclosed are a protocol stack adaptation method and apparatus, where a network transmission optimization technology can be deployed in a wireless network, thereby optimizing a wireless transmission network. The method includes acquiring a first wireless transmission protocol packet, and detecting, by using a first preset detection rule, whether the first wireless transmission protocol packet carries user data. If the first wireless transmission protocol packet carries user data, the method includes adapting the first wireless transmission protocol packet to a corresponding first standard Internet Protocol (IP) data packet; sending the first standard IP data packet to a network transmission optimization (NTO) device; receiving a second standard IP data packet sent by the NTO device; and, adapting the second standard IP data packet to a corresponding second wireless transmission protocol packet.

17 Claims, 10 Drawing Sheets

(51) Int. Cl.
*H04L 29/08* (2006.01)
*H04L 12/46* (2006.01)
*H04W 40/02* (2009.01)
*H04W 80/00* (2009.01)

(52) U.S. Cl.
CPC .............. *H04L 69/04* (2013.01); *H04L 69/16* (2013.01); *H04L 69/18* (2013.01); *H04L 69/22* (2013.01); *H04L 69/321* (2013.01); *H04W 40/02* (2013.01); *H04W 80/00* (2013.01)

(58) Field of Classification Search
CPC .. H04L 69/321; H04W 28/065; H04W 40/02; H04W 80/00
USPC .......................................................... 370/392
See application file for complete search history.

(56) References Cited

U.S. PATENT DOCUMENTS

| | | |
|---|---|---|
| 8,918,859 B2 | 12/2014 | Hilgenkamp |
| 2006/0117139 A1 | 6/2006 | Kobayashi et al. |
| 2007/0115916 A1* | 5/2007 | Nguyen .............. H04L 41/0893 370/351 |
| 2009/0003383 A1 | 1/2009 | Watanabe et al. |
| 2010/0241694 A1* | 9/2010 | Jensen .................... H04L 69/24 709/203 |
| 2012/0099533 A1 | 4/2012 | Kovvali et al. |
| 2012/0127887 A1* | 5/2012 | Kang .................. H04L 12/4633 370/252 |
| 2013/0144973 A1 | 6/2013 | Li et al. |
| 2013/0259045 A1* | 10/2013 | Johansson ............. H04L 45/306 370/392 |
| 2013/0265917 A1 | 10/2013 | Lv et al. |
| 2014/0056137 A1 | 2/2014 | Kovvali et al. |
| 2014/0244814 A1* | 8/2014 | Kuzmack .......... H04L 29/06006 709/223 |
| 2017/0078916 A1* | 3/2017 | Wang .................... H04W 28/06 |

FOREIGN PATENT DOCUMENTS

| | | |
|---|---|---|
| CN | 102457421 A | 5/2012 |
| CN | 102882879 A | 1/2013 |
| JP | 2006155121 A | 6/2006 |
| JP | 2008079334 A | 4/2008 |
| JP | 2012508475 A | 4/2012 |
| WO | WO 02093867 A2 | 11/2002 |
| WO | WO 2005026912 A2 | 3/2005 |
| WO | WO 2013164378 A1 | 11/2013 |

OTHER PUBLICATIONS

"3$^{rd}$ Generation Partnership Project; Technical Specification Group Core Network and Terminals; General Packet Radio System (GPRS) Tunnelling Protocol User Plane (GTPv1-U) (Release 11)," 3GPP TS 29.281, V11.6.0, pp. 1-27, 3$^{rd}$ Generation Partnership Project, Valbonne, France (Mar. 2013).

Degermark et al., "IP Header Compression," Standards Track, Request for comments: 2507, pp. 1-47, Network Working Group (Feb. 1999).

Bormann et al., "Robust Header Compression (ROHC): Framework and four profiles: RTP, UDP, ESP, and uncompressed," Standards Track, Request for comments: 3095, pp. 1-168, Network Working Group (Jul. 2001).

* cited by examiner

PROTOCOL STACK ADAPTATION METHOD AND APPARATUS

CROSS-REFERENCE TO RELATED APPLICATIONS

This application is a continuation of International Patent Application No. PCT/CN2014/078585, filed on May 28, 2014, the disclosure of which is hereby incorporated by reference in its entirety.

TECHNICAL FIELD

The present disclosure relates to the field of communications, and in particular, to a protocol stack adaptation method and apparatus.

BACKGROUND

With development of mobile services, bandwidth demands for a wireless network are constantly increasing. However, capabilities of the wireless network become a key bottleneck for restricting development of mobile bandwidth. In order to implement site expansion and optimize transmission in the wireless network, a method for compressing data transmitted on the wireless network is put forward.

In an existing wireless network protocol, the following two data compression mechanisms are available:

First, a Packet Data Convergence Protocol (PDCP) layer of a wireless interface protocol stack provides header compression for an Internet Protocol (IP) data stream that is transmitted by an upper layer of the PDCP layer, for example, Transmission Control Protocol (TCP)/IP or Real-time Transport Protocol (RTP)/User Datagram Protocol (UDP)/IP header compression.

Second, an application layer of user data provides compression that depends on an application itself.

However, header compression provided by the PDCP layer only compresses a protocol header of user data, which achieves a relatively good effect when a protocol payload is relatively small, but has a limited compression effect when the protocol payload is relatively large. Although compression provided by the application layer of the user data is for the protocol payload, compression is not configured for all applications.

A network transmission optimization (NTO) technology is a technology used for the Internet and an enterprise network, and improves network or application performance by using technologies such as traffic reduction, traffic compression, traffic caching, and protocol acceleration, which can avoid defects of the foregoing two compression mechanisms. However, the NTO technology is for a standard IP protocol stack. Due to a protocol stack structure and an application scenario that are specific to a wireless network, the NTO technology cannot be directly applied. Therefore, how to deploy the network transmission optimization technology in the wireless network becomes a current to-be-resolved issue.

SUMMARY

Embodiments of the present disclosure provide a protocol stack adaptation method and apparatus, so that a network transmission optimization technology can be deployed in a wireless network, thereby optimizing a wireless transmission network.

To achieve the foregoing objective, the embodiments of the present disclosure provide the following solutions:

According to a first aspect, a protocol stack adaptation apparatus is provided, where the apparatus includes an acquiring unit, a detection unit, an adaptation unit, a sending unit, and a receiving unit, where the acquiring unit is configured to acquire a first wireless transmission protocol packet;

the detection unit is configured to detect, by using a first preset detection rule, whether the first wireless transmission protocol packet carries user data;

the adaptation unit is configured to: if the first wireless transmission protocol packet carries user data, adapt the first wireless transmission protocol packet to a corresponding first standard Internet Protocol IP data packet;

the sending unit is configured to send the first standard IP data packet to a network transmission optimization NTO device;

the receiving unit is configured to receive a second standard IP data packet sent by the NTO device; and the adaptation unit is further configured to adapt the second standard IP data packet to a corresponding second wireless transmission protocol packet.

In a first possible implementation manner of the first aspect, with reference to the first aspect, if the first wireless transmission protocol packet is a to-be-compressed wireless transmission protocol packet, the receiving unit is specifically configured to:

receive the second standard IP data packet sent by the NTO device, where the second standard IP data packet is obtained after the NTO device processes N received first standard IP data packets, N≥1, and N is an integer.

In a second possible implementation manner of the first aspect, with reference to the first possible implementation manner of the first aspect, the apparatus further includes a storage unit, a determining unit, and a counting unit, where the acquiring unit is further configured to: if the first wireless transmission protocol packet carries user data, acquire a mapping relationship between first transmission network layer header information of the first wireless transmission protocol packet and quintuple information of the first standard IP data packet;

the storage unit is configured to store the mapping relationship;

the determining unit is configured to: after the receiving unit receives the second standard IP data packet sent by the NTO device and before the adaptation unit adapts the second standard IP data packet to the corresponding second wireless transmission protocol packet, determine, according to quintuple information of the second standard IP data packet and the mapping relationship, N pieces of first transmission network layer header information corresponding to the quintuple information of the second standard IP data packet;

the determining unit is further configured to: if the N piece of the first transmission network layer header information include IP headers, User Datagram Protocol UDP headers, and general packet radio service technology GPRS Tunneling Protocol-User Plane GTP-U headers, and S identifiers of the GTP-U headers in the N pieces of first transmission network layer header information are 1, determine whether transmission network layer session information corresponding to the N pieces of first transmission network layer header information is stored, where the transmission network layer session information includes a GTP-U serial number;

the counting unit is configured to: if the storage unit stores the transmission network layer session information corresponding to the N pieces of first transmission network layer header information, increase the GTP-U serial number in the transmission network layer session information corresponding to the N pieces of first transmission network layer header information by 1;

the storage unit is further configured to: if no transmission network layer session information corresponding to the N pieces of first transmission network header information is stored, store the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information; and the determining unit is further configured to determine, according to the GTP-U serial number in the transmission network layer session information corresponding to the N pieces of first transmission network header information and the N pieces of first transmission network header information, transmission network layer header information corresponding to the second standard IP data packet.

In a third possible implementation manner of the first aspect, with reference to the first possible implementation manner of the first aspect or the second possible implementation manner of the first aspect, the apparatus further includes an updating unit, where the updating unit is configured to: if a destination port number of a UDP header in transmission network layer header information corresponding to the second standard IP data packet is a GTP-U port number, update the GTP-U port number to a wireless network transmission optimization WNTO port number before the adaptation unit adapts the second standard IP data packet to the corresponding second wireless transmission protocol packet, where the WNTO port number represents that the corresponding standard IP data packet has been optimized by means of compression.

In a fourth possible implementation manner of the first aspect, with reference to the first aspect, if the first wireless transmission protocol packet is a to-be-decompressed wireless transmission protocol packet, the receiving unit is specifically configured to:

receive the $m^{th}$ second standard IP data packet sent by the NTO device, where the $m^{th}$ second standard IP data packet is one standard IP data packet of M second standard IP data packets obtained after the NTO device processes the received first standard IP data packet, $1 \leq m \leq M$, and both m and M are integers; and the adaptation unit is specifically configured to:

adapt the $m^{th}$ second standard IP data packet to the corresponding second wireless transmission protocol packet.

In a fifth possible implementation manner of the first aspect, with reference to the fourth possible implementation manner of the first aspect, the apparatus further includes a storage unit, a determining unit, and a counting unit, where the acquiring unit is further configured to: if the first wireless transmission protocol packet carries user data, acquire a mapping relationship between first transmission network layer header information of the first wireless transmission protocol packet and quintuple information of the first standard IP data packet;

the storage unit is configured to store the mapping relationship;

the determining unit is configured to: after the receiving unit receives the $m^{th}$ second standard IP data packet sent by the NTO device and before the adaptation unit adapts the $m^{th}$ second standard IP data packet to the corresponding second wireless transmission protocol packet, determine, according to quintuple information of the $m^{th}$ second standard IP data packet and the mapping relationship, first transmission network layer header information corresponding to the quintuple information of the $m^{th}$ second standard IP data packet;

the determining unit is further configured to: if the first transmission network layer header information includes an IP header, a UDP header, and a GTP-U header, and an S identifier of the GTP-U header in the first transmission network layer header information is 1, determine whether transmission network layer session information corresponding to the first transmission network layer header information is stored, where the transmission network layer session information includes a GTP-U serial number;

the counting unit is configured to: if the storage unit stores the transmission network layer session information corresponding to the first transmission network header information, increase the GTP-U serial number in the transmission network layer session information corresponding to the first transmission network header information by 1;

the storage unit is further configured to: if no transmission network layer session information corresponding to the first transmission network header information is stored, store the transmission network layer session information corresponding to the first transmission network header information, where the GTP-U serial number in the transmission network layer session information is a GTP-U serial number of the GTP-U header in the first transmission network header information; and the determining unit is further configured to determine, according to the GTP-U serial number in the transmission network layer session information corresponding to the first transmission network header information, and the first transmission network header information, transmission network layer header information corresponding to the $m^{th}$ second standard IP data packet.

In a sixth possible implementation manner of the first aspect, with reference to the first aspect to the fifth possible implementation manner of the first aspect, the apparatus further includes a determining unit, and a fragmentation unit, where the determining unit is configured to: if the first wireless transmission protocol packet does not carry user data, after the detection unit detects whether the first wireless transmission protocol packet carries user data, determine whether a total length of the first wireless transmission protocol packet exceeds a preset transmission length threshold of a data link layer;

the fragmentation unit is configured to: if the total length of the first wireless transmission protocol packet exceeds the preset transmission length threshold, perform IP fragmentation on the first wireless transmission protocol packet; and the sending unit is further configured to send the first wireless transmission protocol packet on which IP fragmentation is performed.

In a seventh possible implementation manner of the first aspect, with reference to the first aspect to the sixth possible implementation manner of the first aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a GTP encapsulated user plane data unit G-PDU; and if the message field type of the transmission network layer GTP-U header is the G-PDU, determining that the acquired wireless transmission protocol packet carries user data.

In an eighth possible implementation manner of the first aspect, with reference to the fourth possible implementation manner of the first aspect or the fifth possible implementation manner of the first aspect, the apparatus further includes an updating unit, where the updating unit is configured to: if a destination port number of a UDP header in the transmission network layer header information corresponding to the $m^{th}$ second standard IP data packet is a WNTO port number, update the WNTO port number to a GTP-U port number before the adaptation unit adapts the $m^{th}$ second standard IP data packet to the corresponding second wireless transmission protocol packet, where the WNTO port number represents that the corresponding standard IP data packet has been optimized by means of compression.

In a ninth possible implementation manner of the first aspect, with reference to the eighth possible implementation manner of the first aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

According to a second aspect, a protocol stack adaptation method is provided, where the method includes:

acquiring a first wireless transmission protocol packet;

detecting, by using a first preset detection rule, whether the first wireless transmission protocol packet carries user data;

if the first wireless transmission protocol packet carries user data, adapting the first wireless transmission protocol packet to a corresponding first standard Internet Protocol IP data packet;

sending the first standard IP data packet to a network transmission optimization NTO device;

receiving a second standard IP data packet sent by the NTO device; and adapting the second standard IP data packet to a corresponding second wireless transmission protocol packet.

In a first possible implementation manner of the second aspect, with reference to the second aspect, if the first wireless transmission protocol packet is a to-be-compressed wireless transmission protocol packet, the receiving a second standard IP data packet sent by the NTO device includes:

receiving the second standard IP data packet sent by the NTO device, where the second standard IP data packet is obtained after the NTO device processes N received first standard IP data packets, N≥1, and N is an integer.

In a second possible implementation manner of the second aspect, if the first wireless transmission protocol packet carries user data, the method further includes:

acquiring and storing a mapping relationship between first transmission network layer header information of the first wireless transmission protocol packet and quintuple information of the first standard IP data packet; and after the receiving a second standard IP data packet sent by the NTO device and before the adapting the second standard IP data packet to a corresponding second wireless transmission protocol packet, the method further includes:

determining, according to quintuple information of the second standard IP data packet and the mapping relationship, N pieces of first transmission network layer header information corresponding to the quintuple information of the second standard IP data packet;

if the N piece of the first transmission network layer header information include IP headers, User Datagram Protocol UDP headers, and general packet radio service technology GPRS Tunneling Protocol-User Plane GTP-U headers, and S identifiers of the GTP-U headers in the N pieces of first transmission network layer header information are 1, determining whether transmission network layer session information corresponding to the N pieces of first transmission network layer header information is stored, where the transmission network layer session information includes a GTP-U serial number;

if the transmission network layer session information corresponding to the N pieces of first transmission network layer header information is stored, increasing the GTP-U serial number in the transmission network layer session information corresponding to the N pieces of first transmission network layer header information by 1; or if no transmission network layer session information corresponding to the N pieces of first transmission network header information is stored, storing the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information; and determining, according to the GTP-U serial number in the transmission network layer session information corresponding to the N pieces of first transmission network header information and the N pieces of first transmission network header information, transmission network layer header information corresponding to the second standard IP data packet.

In a third possible implementation manner of the second aspect, with reference to the first possible implementation manner of the second aspect or the second possible implementation manner of the second aspect, before the adapting the second standard IP data packet to a corresponding second wireless transmission protocol packet, the method further includes:

if a destination port number of a UDP header in transmission network layer header information corresponding to the second standard IP data packet is a GTP-U port number, updating the GTP-U port number to a wireless network transmission optimization WNTO port number, where the WNTO port number represents that the corresponding standard IP data packet has been optimized by means of compression.

In a fourth possible implementation manner of the second aspect, with reference to the second aspect, if the first wireless transmission protocol packet is a to-be-decompressed wireless transmission protocol packet, the receiving a second standard IP data packet sent by the NTO device includes:

receiving the $m^{th}$ second standard IP data packet sent by the NTO device, where the $m^{th}$ second standard IP data packet is one standard IP data packet of M second standard IP data packets obtained after the NTO device processes the received first standard IP data packet, $1 \leq m \leq M$, and both m and M are integers; and the adapting the second standard IP data packet to a corresponding second wireless transmission protocol packet includes:

adapting the $m^{th}$ second standard IP data packet to the corresponding second wireless transmission protocol packet.

In a fifth possible implementation manner of the second aspect, with reference to the fourth possible implementation manner of the second aspect, if the first wireless transmission protocol packet carries user data, the method further includes:

acquiring and storing a mapping relationship between first transmission network layer header information of the first wireless transmission protocol packet and quintuple information of the first standard IP data packet; and after the receiving the $m^{th}$ second standard IP data packet sent by the NTO device and before the adapting the $m^{th}$ second standard IP data packet to the corresponding second wireless transmission protocol packet, the method further includes:

determining, according to quintuple information of the $m^{th}$ second standard IP data packet and the mapping relationship, first transmission network layer header information corresponding to the quintuple information of the $m^{th}$ second standard IP data packet;

if the first transmission network layer header information includes an IP header, a UDP header, and a GTP-U header, and an S identifier of the GTP-U header in the first transmission network layer header information is 1, determining whether transmission network layer session information corresponding to the first transmission network layer header information is stored, where the transmission network layer session information includes a GTP-U serial number;

if the transmission network layer session information corresponding to the first transmission network header information is stored, increasing the GTP-U serial number in the transmission network layer session information corresponding to the first transmission network header information by 1; or if no transmission network layer session information corresponding to the first transmission network header information is stored, storing the transmission network layer session information corresponding to the first transmission network header information, where the GTP-U serial number in the transmission network layer session information is a GTP-U serial number of the GTP-U header in the first transmission network header information; and determining, according to the GTP-U serial number in the transmission network layer session information corresponding to the first transmission network header information, and the first transmission network header information, transmission network layer header information corresponding to the $m^{th}$ second standard IP data packet.

In a sixth possible implementation manner of the second aspect, with reference to the second aspect to the fifth possible implementation manner of the second aspect, after the detecting whether the first wireless transmission protocol packet carries user data, the method further includes:

if the first wireless transmission protocol packet does not carry user data, determining whether a total length of the first wireless transmission protocol packet exceeds a preset transmission length threshold of a data link layer;

if the total length of the first wireless transmission protocol packet exceeds the preset transmission length threshold, performing IP fragmentation on the first wireless transmission protocol packet; and sending the first wireless transmission protocol packet on which IP fragmentation is performed.

In a seventh possible implementation manner of the second aspect, with reference to the second aspect to the sixth possible implementation manner of the second aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a GTP encapsulated user plane data unit G-PDU; and if the message field type of the transmission network layer GTP-U header is the G-PDU, determining that the acquired wireless transmission protocol packet carries user data.

In an eighth possible implementation manner of the second aspect, with reference to the fourth possible implementation manner of the second aspect or the fifth possible implementation manner of the second aspect, before the adapting the $m^{th}$ second standard IP data packet to the corresponding second wireless transmission protocol packet, the method further includes:

if a destination port number of a UDP header in the transmission network layer header information corresponding to the $m^{th}$ second standard IP data packet is a WNTO port number, updating the WNTO port number to a GTP-U port number, where the WNTO port number represents that the corresponding standard IP data packet has been optimized by means of compression.

In a ninth possible implementation manner of the second aspect, with reference to the eighth possible implementation manner of the second aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

According to a third aspect, a protocol stack adaptation apparatus is provided, where the apparatus includes a processor, a transmitter, and a receiver, where the processor is configured to acquire a first wireless transmission protocol packet;

the processor is further configured to detect, by using a first preset detection rule, whether the first wireless transmission protocol packet carries user data;

the processor is further configured to: if the first wireless transmission protocol packet carries user data, adapt the first wireless transmission protocol packet to a corresponding first standard Internet Protocol IP data packet;

the transmitter is configured to send the first standard IP data packet to a network transmission optimization NTO device;

the receiver is configured to receive a second standard IP data packet sent by the NTO device; and the processor is further configured to adapt the second standard IP data packet to a corresponding second wireless transmission protocol packet.

In a first possible implementation manner of the third aspect, with reference to the third aspect, if the first wireless transmission protocol packet is a to-be-compressed wireless transmission protocol packet, the receiver is specifically configured to:

receive the second standard IP data packet sent by the NTO device, where the second standard IP data packet is obtained after the NTO device processes N received first standard IP data packets, N≥1, and N is an integer.

In a second possible implementation manner of the third aspect, with reference to the first possible implementation manner of the third aspect, the apparatus further includes a memory, where the processor is further configured to: if the first wireless transmission protocol packet carries user data, acquire a mapping relationship between first transmission network layer header information of the first wireless transmission protocol packet and quintuple information of the first standard IP data packet;

the memory is configured to store the mapping relationship;

the processor is further configured to: after the receiver receives the second standard IP data packet sent by the NTO device and before the second standard IP data packet is adapted to the corresponding second wireless transmission protocol packet, determine, according to quintuple information of the second standard IP data packet and the mapping relationship, N pieces of first transmission network layer header information corresponding to the quintuple information of the second standard IP data packet;

the processor is further configured to: if the N piece of the first transmission network layer header information include IP headers, User Datagram Protocol UDP headers, and general packet radio service technology GPRS Tunneling Protocol-User Plane GTP-U headers, and S identifiers of the GTP-U headers in the N pieces of first transmission network layer header information are 1, determine whether transmission network layer session information corresponding to the N pieces of first transmission network layer header information is stored, where the transmission network layer session information includes a GTP-U serial number;

the processor is further configured to: if the memory stores the transmission network layer session information corresponding to the N pieces of first transmission network layer header information, increase the GTP-U serial number in the transmission network layer session information corresponding to the N pieces of first transmission network layer header information by 1;

the memory is further configured to: if no transmission network layer session information corresponding to the N pieces of first transmission network header information is stored, store the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information; and the processor is further configured to determine, according to the GTP-U serial number in the transmission network layer session information corresponding to the N pieces of first transmission network header information and the N pieces of first transmission network header information, transmission network layer header information corresponding to the second standard IP data packet.

In a third possible implementation of the third aspect, with reference to the first possible implementation manner of the third aspect or the second possible implementation manner of the third aspect, the processor is further configured to: if a destination port number of a UDP header in transmission network layer header information corresponding to the second standard IP data packet is a GTP-U port number, update the GTP-U port number to a wireless network transmission optimization WNTO port number before adapting the second standard IP data packet to the corresponding second wireless transmission protocol packet, where the WNTO port number represents that the corresponding standard IP data packet has been optimized by means of compression.

In a fourth possible implementation manner of the third aspect, with reference to the third aspect, if the first wireless transmission protocol packet is a to-be-decompressed wireless transmission protocol packet, the receiver is specifically configured to:

receive the $m^{th}$ second standard IP data packet sent by the NTO device, where the $m^{th}$ second standard IP data packet is one standard IP data packet of M second standard IP data packets obtained after the NTO device processes the received first standard IP data packet, 1≤m≤M, and both m and M are integers; and the processor is specifically configured to:

adapt the $m^{th}$ second standard IP data packet to the corresponding second wireless transmission protocol packet.

In a fifth possible implementation manner of the third aspect, with reference to the fourth possible implementation manner of the third aspect, the apparatus further includes a memory, where the processor is further configured to: if the first wireless transmission protocol packet carries user data, acquire a mapping relationship between first transmission network layer header information of the first wireless transmission protocol packet and quintuple information of the first standard IP data packet;

the memory is configured to store the mapping relationship;

the processor is further configured to: after the receiver receives the $m^{th}$ second standard IP data packet sent by the NTO device and before the $m^{th}$ second standard IP data packet is adapted to the corresponding second wireless transmission protocol packet, determine, according to quintuple information of the $m^{th}$ second standard IP data packet and the mapping relationship, first transmission network layer header information corresponding to the quintuple information of the $m^{th}$ second standard IP data packet;

the processor is further configured to: if the first transmission network layer header information includes an IP header, a UDP header, and a GTP-U header, and an S identifier of the GTP-U header in the first transmission network layer header information is 1, determine whether transmission network layer session information corresponding to the first transmission network layer header information is stored, where the transmission network layer session information includes a GTP-U serial number;

the processor is further configured to: if the memory stores the transmission network layer session information corresponding to the first transmission network header information, increase the GTP-U serial number in the transmission network layer session information corresponding to the first transmission network header information by 1;

the memory is further configured to: if no transmission network layer session information corresponding to the first transmission network header information is stored, store the transmission network layer session information corresponding to the first transmission network header information, where the GTP-U serial number in the transmission network layer session information is a GTP-U serial number of the GTP-U header in the first transmission network header information; and the processor is further configured to determine, according to the GTP-U serial number in the transmission network layer session information corresponding to the first transmission network header information, and the first transmission network header information, transmission network layer header information corresponding to the $m^{th}$ second standard IP data packet.

In a sixth possible implementation manner of the third aspect, with reference to the third aspect to the fifth possible implementation manner of the third aspect, the processor is further configured to: if the first wireless transmission protocol packet does not carry user data, after detecting whether the first wireless transmission protocol packet carries user data, determine whether a total length of the first wireless transmission protocol packet exceeds a preset transmission length threshold of a data link layer;

the processor is further configured to: if the total length of the first wireless transmission protocol packet exceeds the preset transmission length threshold, perform IP fragmentation on the first wireless transmission protocol packet; and the transmitter is further configured to send the first wireless transmission protocol packet on which IP fragmentation is performed.

In a seventh possible implementation manner of the third aspect, with reference to the third aspect to the sixth possible implementation manner of the third aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a GTP encapsulated user plane data unit G-PDU; and if the message field type of the transmission network layer GTP-U header is the G-PDU, determining that the acquired wireless transmission protocol packet carries user data.

In an eighth possible implementation manner of the third aspect, with reference to the fourth possible implementation manner of the third aspect or the fifth possible implementation manner of the third aspect, the processor is further configured to: if a destination port number of a UDP header in the transmission network layer header information corresponding to the $m^{th}$ second standard IP data packet is a WNTO port number, update the WNTO port number to a GTP-U port number before adapting the $m^{th}$ second standard IP data packet to the corresponding second wireless transmission protocol packet, where the WNTO port number represents that the corresponding standard IP data packet has been optimized by means of compression.

In a ninth possible implementation manner of the third aspect, with reference to the eighth possible implementation manner of the third aspect, if the first transmission network layer header information of the first wireless transmission protocol packet includes an IP header, a UDP header, and a GTP-U header, the first preset detection rule includes:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

The embodiments of the present disclosure provide a protocol stack adaptation method and apparatus. The protocol stack adaptation apparatus can adapt a wireless transmission protocol packet to a standard IP data packet and then send the standard IP data packet to an NTO device for processing, and can adapt a standard IP data packet obtained after the NTO device performs processing to a wireless transmission protocol packet. Therefore, an NTO technology can be deployed in a wireless transmission network, which can reduce bandwidth occupation of data traffic in a wireless network, decrease wireless network and user application latencies, and achieve a purpose of optimizing transmission in the wireless network.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

In order to clearly and concisely describe the following embodiments, several brief introductions are first provided.

First, NTO technology is described.

NTO is a technology used for the Internet and an enterprise network, and improves network and application performance by using technologies such as traffic reduction, traffic compression, traffic caching, and protocol acceleration. The NTO technology includes technologies such as data deduplication, conventional data compression, a caching mechanism, and protocol acceleration. The foregoing technologies may be used separately or in a combined manner, so as to achieve purposes of reducing bandwidth occupation and decreasing a network latency. The data deduplication technology is different from a conventional data compression algorithm. The conventional data compression algorithm is only for data compression of a single piece of user data within a local range, while the data deduplication technology can implement compression of a single piece of user data within a relatively large range or duplicate data of different users on a same link, and therefore can achieve a relatively good compression effect.

Figure 1:
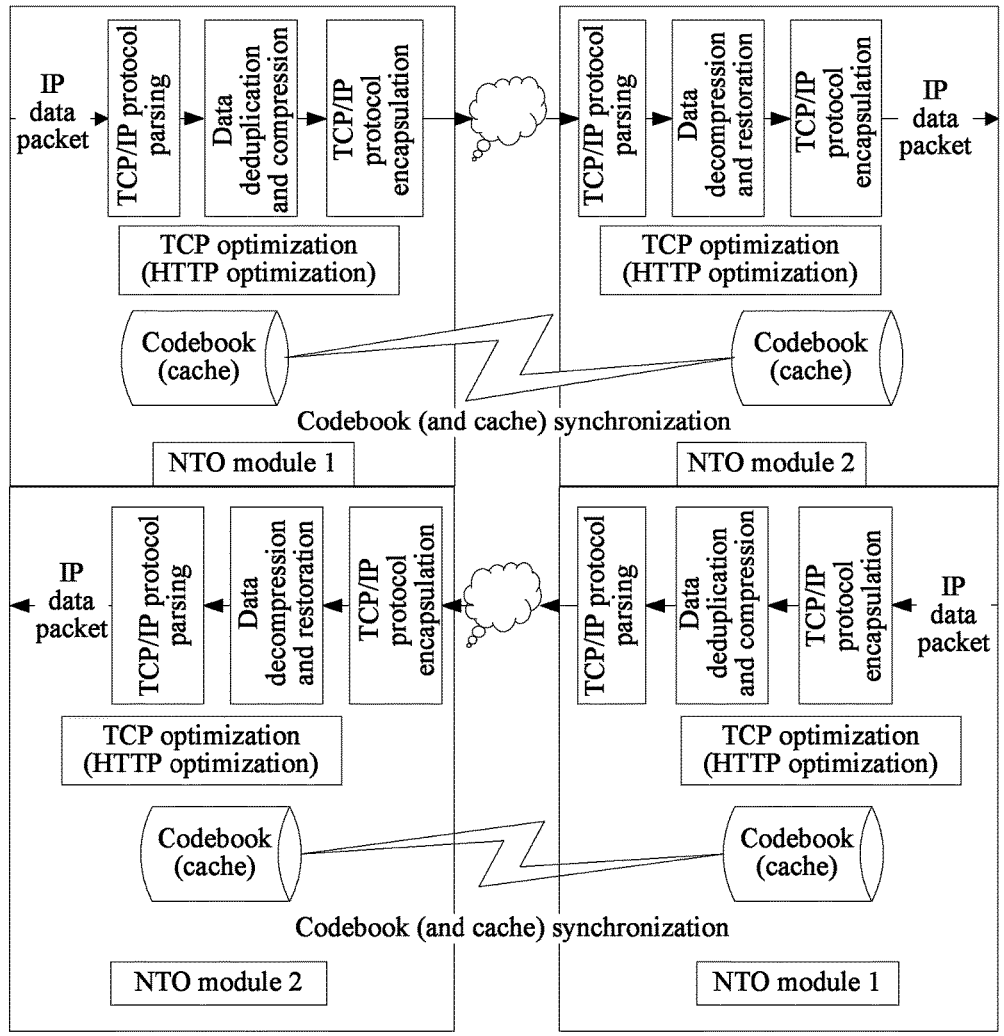
FIG. 1 is a schematic structural diagram of an NTO device according to an embodiment of the present disclosure.

An NTO module includes two parts, and is deployed in a one-to-one or one-to-many manner. A processing module through which a data stream in one direction (uplink or downlink) passes is shown in FIG. 1. Each NTO module includes a TCP/IP protocol processing submodule, a data deduplication and compression submodule, a data decompression and restoration submodule, optional TCP optimization, Hypertext Transfer Protocol (HTTP) optimization, and codebook caching submodules, and the like. The TCP/IP protocol processing submodule is divided into TCP/IP protocol parsing submodule and TCP/IP protocol encapsulation submodule.

Processing flows of several main submodules in the NTO module are as follows:

1. TCP/IP protocol parsing submodule: configured to input a standard IP data packet, perform IP fragment reassembly, parse a transport layer protocol, acquire application layer data, and if a protocol layer is a TCP protocol, perform TCP session reassembly.

2. Data deduplication and compression submodule: divided into a slicing module and an encoding module.

2.1. Slicing module: configured to slice application data, and generate a fingerprint for a slice, that is, a digital digest of a data slice; and further configured to establish an index structure for a fingerprint and raw data, generate a codebook, and synchronize the codebook between NTO modules at two ends.

2.2. Encoding module: configured to determine, according to a fingerprint, whether there are duplicate data slices; and after replacing a duplicate data slice with a fingerprint, combine the fingerprint with a non-duplicate data slice, and perform re-coding, where compression may be performed by selecting a conventional Lempel-Ziv compression algorithm, to generate new application data.

3. Data decompression and restoration submodule:

According to an encoding rule of the foregoing encoding module, if application data is compressed, the application data is decompressed to obtain raw data. After that, a fingerprint and a non-duplicate data slice are identified, a codebook is queried, and the fingerprint is replaced with the raw data. Finally, restored data slices are assembled as a whole.

4. TCP/IP protocol encapsulation submodule: configured to re-encapsulate encoded application layer data into a standard IP data packet, and send the standard IP data packet.

5. Optionally, the TCP/IP protocol processing submodule is further configured to perform transmission optimization on a TCP data stream.

6. Optionally, the TCP/IP protocol processing submodule is further configured to perform transmission optimization on an HTTP service stream.

7. Optionally, the TCP/IP protocol processing submodule is further configured to perform cache optimization on application data.

Second, wireless transmission protocol is described.

Figure 2A:
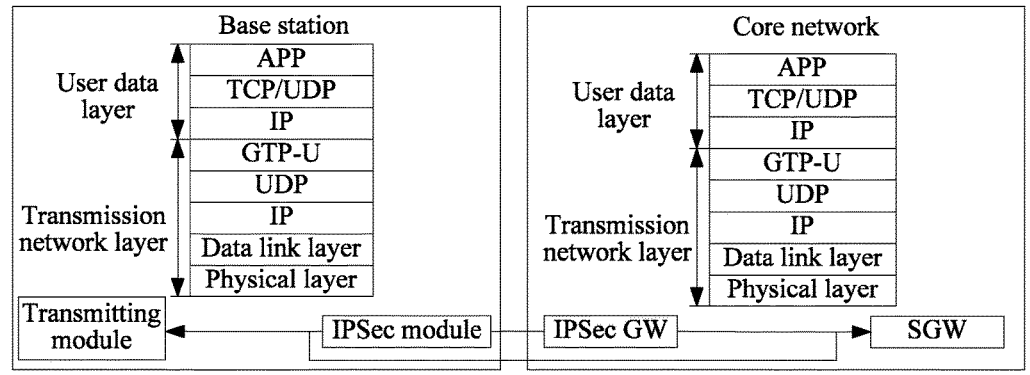
FIG. 2A is a schematic structural diagram of an LTE Backhaul user plane protocol stack according to an embodiment of the present disclosure.

The wireless transmission protocol refers to a protocol for transmitting user data on a user plane of a wireless network. The wireless transmission protocol is divided into two layers: a user data layer and a transmission network layer. The user data layer is used to carry user IP data transmitted between a terminal and a server, and the transmission network layer is used to carry the user data layer. A backhaul network (Backhaul) of a Long Term Evolution (LTE) network is used as an example. A user plane protocol stack between a base station and a serving gateway (SGW) is shown in FIG. 2A. A transmission module inside the base station completes forwarding of wireless transmission protocol data, an Internet Protocol security (IPSec) module completes data encryption and decryption on a base station side, an IPSec gateway (GW) completes data encryption and decryption on a core network side, and the SGW completes processing and forwarding of data on the core network side.

Figure 2B:
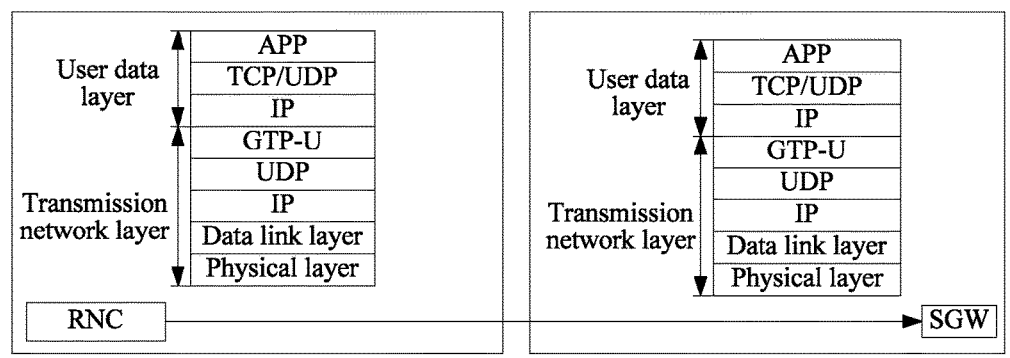
FIG. 2B is a schematic structural diagram of a UMTS Iu-PS user plane protocol stack according to an embodiment of the present disclosure.

An Iu-packet switch (PS) interface of a Universal Mobile Telecommunications System (UMTS) is used as an example. A user plane protocol stack between a radio network controller (RNC) and a serving general packet radio service technology (GPRS) support node (SGSN) is shown in FIG. 2B. After completing Iub protocol stack processing, the RNC forwards data in a PS domain to the SGSN.

In the foregoing LTE Backhaul user plane protocol stack or UMTS Iu-PS interface user plane protocol stack, the wireless transmission protocol is divided into the following two layers:

(1) User data layer: includes an IP header, a TCP/UDP header, and application (App) layer data; and (2) Transmission network layer: includes a GPRS Tunneling Protocol (GTP) User Plane (GTP-U) header, and a UDP header, an IP header, a data link layer, and a physical layer that are under a GTP-U layer.

User IP data between a base station transmission module and an SGW in an LTE network, and user IP data between an RNC and an SGSN in a UMTS network undergo protocol encapsulation at the transmission network layer. However, the NTO technology is for a standard IP protocol stack structure, and cannot be directly applied to an existing wireless network.

Third, GTP-U header format is described.

A GTP-U header format specified in 3GPP TS 29.281 is shown in Table 1.

TABLE 1

| Byte | Bit | | | | | | | |
|---|---|---|---|---|---|---|---|---|
| | 8 | 7 | 6 | 5 | 4 | 3 | 2 | 1 |
| 1 | Version number | | | PT | (*)[(0)] | E | S | PN |
| 2 | Message type | | | | | | | |
| 3 | Length (the first byte) | | | | | | | |
| 4 | Length (the second byte) | | | | | | | |
| 5 | Tunnel endpoint identifier (Tunnel Endpoint Identifier, TEID) (the first byte) | | | | | | | |
| 6 | TEID (the second byte) | | | | | | | |
| 7 | TEID (the third byte) | | | | | | | |
| 8 | TEID (the fourth byte) | | | | | | | |
| 9 | Serial number (the first byte)[(1) (4)] | | | | | | | |
| 10 | Serial number (the second byte)[(1) (4)] | | | | | | | |
| 11 | Network-packet data unit (Network-Packet Data Unit, N-PDU) number[(2) (4)] | | | | | | | |
| 12 | Next extension header type[(3) (4)] | | | | | | | |

Annotation 0: (*) indicates an idle bit.
Annotation 1: [(1)]indicates that the corresponding field is valid when an S flag is 1.
Annotation 2: [(2)]indicates that the corresponding field is valid when a PN flag is 1.
Annotation 3: [(3)]indicates that the corresponding field is valid when an E flag is 1.
Annotation 4: [(4)] indicates that the field appears when at least one of S, PN, and E is 1.
A format of a GTP-U extension header is shown in Table 2.

TABLE 2

Extension header length
Extension header content
Next extension header type (Note: this field is 0 when there is no subsequent extension header)

A GTP-U analytic function is as follows:

1. A pointer ptr is defined to point to the GTP-U header, and a GTP-U header length gtp_hlen=0 is defined.

2. A header length is fixed by moving backward 8 bytes: gtp_hlen+=8.

3. It is determined, according to an E, S, or PN flag bit, whether there is an optional field. If there is a 4-byte optional field, gtp_hlen+=4 is performed.

4. If there is an optional field, it is determined, according to the E flag bit and the field indicating a next extension header type, whether there is an extension header. If there is an extension header, step 5 is performed; otherwise, gtp_hlen is the GTP-U header length, and the GTP-U analytic function is returned.

5. Parsing is performed according to the field indicating a next extension header length in the extension header: gtp_hlen+=(Extension Header Length*4), and the field indicating a next extension header type at (ptr+gtp_hlen−1) is read. If a read value is not 0, step 4 is cyclically performed till the field indicating a next extension header type is 0. In this case, the GTP-U header length gtp_hlen is obtained, and the GTP-U analytic function is returned.

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In order to clearly describe the technical solutions in the embodiments of the present disclosure, in the embodiments of the present disclosure, terms such as "first" and "second" are used to distinguish same items or similar items that have basically same functions and purposes. A person skilled in the art may understand that the terms "first" and "second" do not limit a quantity or an execution sequence.

In addition, the wireless transmission protocol packet involved in the present disclosure refers to a data packet encapsulated by using a wireless transmission protocol.

Embodiment 1

Figure 3:
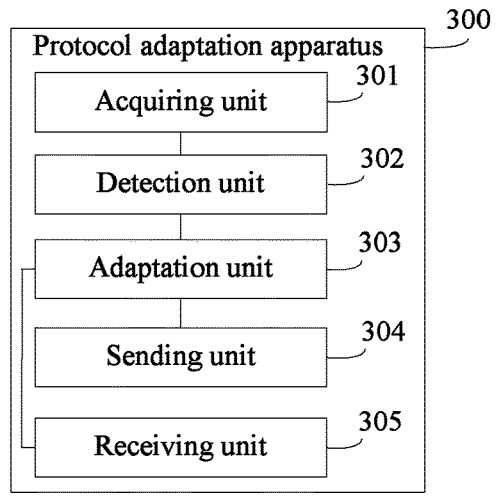
FIG. 3 is a first schematic structural diagram of a protocol adaptation apparatus according to an embodiment of the present disclosure.

This embodiment of the present disclosure provides a protocol stack adaptation apparatus 300. Specifically, as shown in FIG. 3, the apparatus 300 includes: an acquiring unit 301, a detection unit 302, an adaptation unit 303, a sending unit 304, and a receiving unit 305.

The acquiring unit 301 is configured to acquire a first wireless transmission protocol packet.

The detection unit 302 is configured to detect, by using a first preset detection rule, whether the first wireless transmission protocol packet carries user data.

Specially, if first transmission network layer header information of the first wireless transmission protocol packet includes an IP header, a UDP header, and a GTP-U header, the first preset detection rule may include:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a GTP encapsulated user plane data unit G-PDU (G-PDU); and if the message field type of the transmission network layer GTP-U header is the G-PDU, determining that the acquired wireless transmission protocol packet carries user data.

Certainly, there may be another first preset detection rule, and this embodiment of the present disclosure imposes no specific limitation thereon.

The adaptation unit 303 is configured to: if the first wireless transmission protocol packet carries user data, adapt the first wireless transmission protocol packet to a corresponding first standard Internet Protocol IP data packet.

The sending unit 304 is configured to send the first standard IP data packet to a network transmission optimization NTO device.

The receiving unit 305 is configured to receive a second standard IP data packet sent by the NTO device.

The adaptation unit 303 is further configured to adapt the second standard IP data packet to a corresponding second wireless transmission protocol packet.

In a possible implementation manner, if the first wireless transmission protocol packet is a to-be-compressed wireless transmission protocol packet, the receiving unit 305 is specifically configured to:

receive the second standard IP data packet sent by the NTO device, where the second standard IP data packet is obtained after the NTO device processes N received first standard IP data packets, N≥1, and N is an integer.

Figure 4:
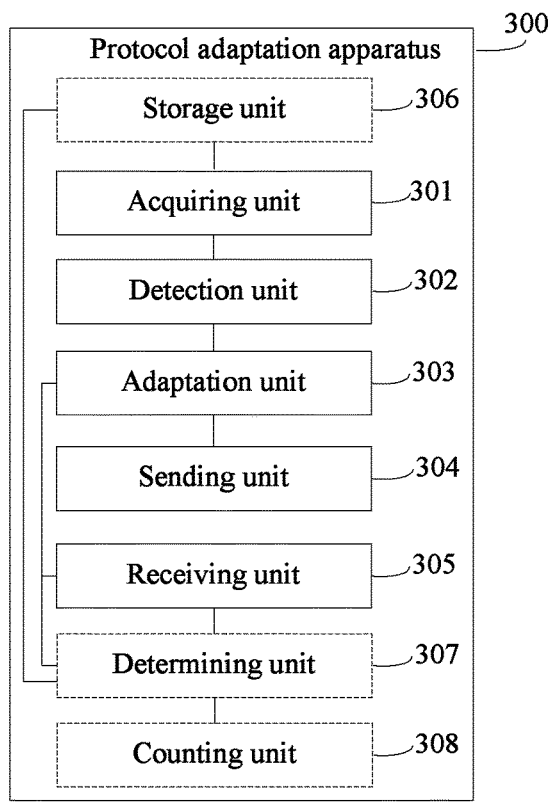
FIG. 4 is a second schematic structural diagram of a protocol adaptation apparatus according to an embodiment of the present disclosure.

Further, as shown in FIG. 4, the apparatus 300 further includes: a storage unit 306, a determining unit 307, and a counting unit 308.

The acquiring unit 301 is further configured to: if the first wireless transmission protocol packet carries user data, acquire a mapping relationship between first transmission network layer header information of the first wireless transmission protocol packet and quintuple information of the first standard IP data packet.

The storage unit 306 is configured to store the mapping relationship.

The determining unit 307 is configured to: after the receiving unit 305 receives the second standard IP data packet sent by the NTO device and before the adaptation unit 303 adapts the second standard IP data packet to the corresponding second wireless transmission protocol packet, determine, according to quintuple information of the second standard IP data packet and the mapping relationship, N pieces of first transmission network layer header information corresponding to the quintuple information of the second standard IP data packet.

The determining unit 307 is further configured to: if the N pieces of the first transmission network layer headers include IP headers, User Datagram Protocol UDP headers, and general packet radio service technology GPRS Tunneling Protocol-User Plane GTP-U headers, and S identifiers of the GTP-U headers in the N pieces of first transmission network layer header information are 1, determine whether transmission network layer session information corresponding to the N pieces of first transmission network layer header information is stored, where the transmission network layer session information includes a GTP-U serial number.

The counting unit 308 is configured to: if the storage unit 306 stores the transmission network layer session information corresponding to the N pieces of first transmission network layer header information, increase the GTP-U serial number in the transmission network layer session information corresponding to the N pieces of first transmission network layer header information by 1.

The storage unit 306 is further configured to: if no transmission network layer session information corresponding to the N pieces of first transmission network header information is stored, store the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information.

The determining unit 307 is further configured to determine, according to the GTP-U serial number in the transmission network layer session information corresponding to the N pieces of first transmission network header information and the N pieces of first transmission network header information, transmission network layer header information corresponding to the second standard IP data packet.

Figure 5:
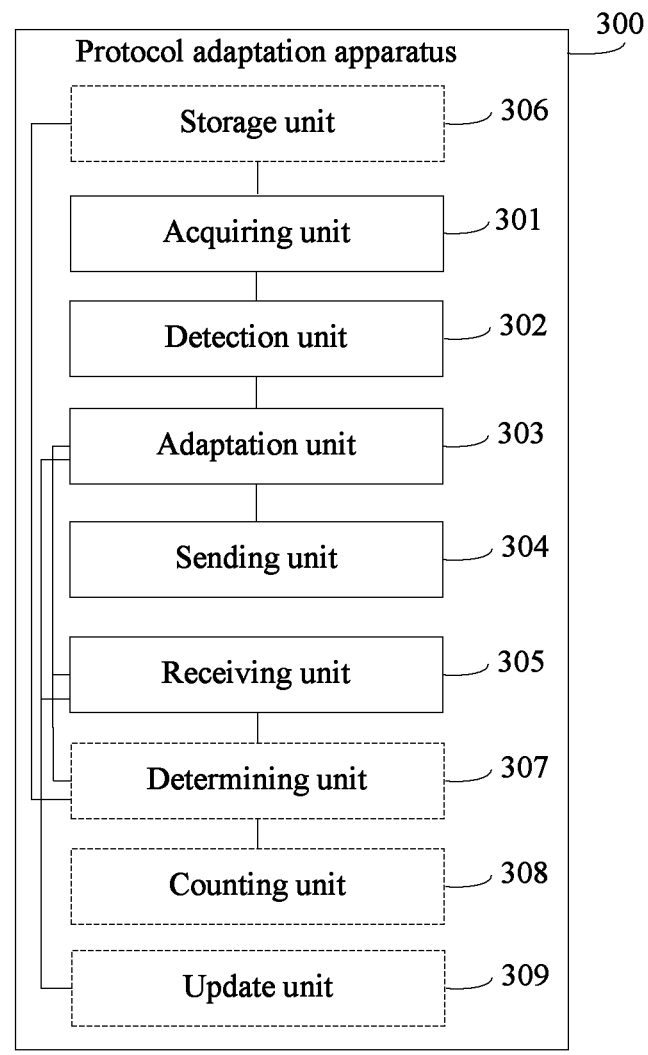
FIG. 5 is a third schematic structural diagram of a protocol adaptation apparatus according to an embodiment of the present disclosure.

Further, as shown in FIG. 5, the apparatus 300 further includes an updating unit 309.

The updating unit 309 is configured to: if a destination port number of a UDP header in transmission network layer header information corresponding to the second standard IP data packet is a GTP-U port number, update the GTP-U port number to a wireless network transmission optimization (WNTO) port number before the adaptation unit 303 adapts the second standard IP data packet to the corresponding second wireless transmission protocol packet, where the WNTO port number represents that the corresponding standard IP data packet has been optimized by means of compression.

In another possible implementation manner, if the first wireless transmission protocol packet is a to-be-decompressed wireless transmission protocol packet, the receiving unit 305 is specifically configured to:

receive the $m^{th}$ second standard IP data packet sent by the NTO device, where the $m^{th}$ second standard IP data packet is one standard IP data packet of M second standard IP data packets obtained after the NTO device processes the received first standard IP data packet, $1 \leq m \leq M$, and both m and M are integers.

The adaptation unit 303 is specifically configured to:

adapt the $m^{th}$ second standard IP data packet to the corresponding second wireless transmission protocol packet.

Further, as shown in FIG. 4, the apparatus 300 further includes: a storage unit 306, a determining unit 307, and a counting unit 308.

The acquiring unit 301 is further configured to: if the first wireless transmission protocol packet carries user data, acquire a mapping relationship between first transmission network layer header information of the first wireless transmission protocol packet and quintuple information of the first standard IP data packet.

The storage unit 306 is configured to store the mapping relationship.

The determining unit 307 is configured to: after the receiving unit 305 receives the $m^{th}$ second standard IP data packet sent by the NTO device and before the adaptation unit 303 adapts the $m^{th}$ second standard IP data packet to the corresponding second wireless transmission protocol packet, determine, according to quintuple information of the $m^{th}$ second standard IP data packet and the mapping relationship, first transmission network layer header information corresponding to the quintuple information of the $m^{th}$ second standard IP data packet.

The determining unit 307 is further configured to: if the first transmission network layer header information includes an IP header, a UDP header, and a GTP-U header, and an S identifier of the GTP-U header in the first transmission network layer header information is 1, determine whether transmission network layer session information corresponding to the first transmission network layer header information is stored, where the transmission network layer session information includes a GTP-U serial number.

The counting unit 308 is configured to: if the storage unit 306 stores the transmission network layer session information corresponding to the first transmission network header information, increase the GTP-U serial number in the transmission network layer session information corresponding to the first transmission network header information by 1.

The storage unit 306 is further configured to: if no transmission network layer session information corresponding to the first transmission network header information is stored, store the transmission network layer session information corresponding to the first transmission network header information, where the GTP-U serial number in the transmission network layer session information is a GTP-U serial number of the GTP-U header in the first transmission network header information.

The determining unit 307 is further configured to determine, according to the GTP-U serial number in the transmission network layer session information corresponding to the first transmission network header information, and the first transmission network header information, transmission network layer header information corresponding to the $m^{th}$ second standard IP data packet.

Further, as shown in FIG. 5, the apparatus 300 further includes an updating unit 309.

The updating unit 309 is configured to: if a destination port number of a UDP header in the transmission network layer header information corresponding to the $m^{th}$ second standard IP data packet is a WNTO port number, update the WNTO port number to a GTP-U port number before the adaptation unit 303 adapts the $m^{th}$ second standard IP data packet to the corresponding second wireless transmission protocol packet, where the WNTO port number represents that the corresponding standard IP data packet has been optimized by means of compression.

Specially, in this case, if the first transmission network layer header information of the first wireless transmission protocol packet includes an IP header, a UDP header, and a GTP-U header, the first preset detection rule may include:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

Figure 6:
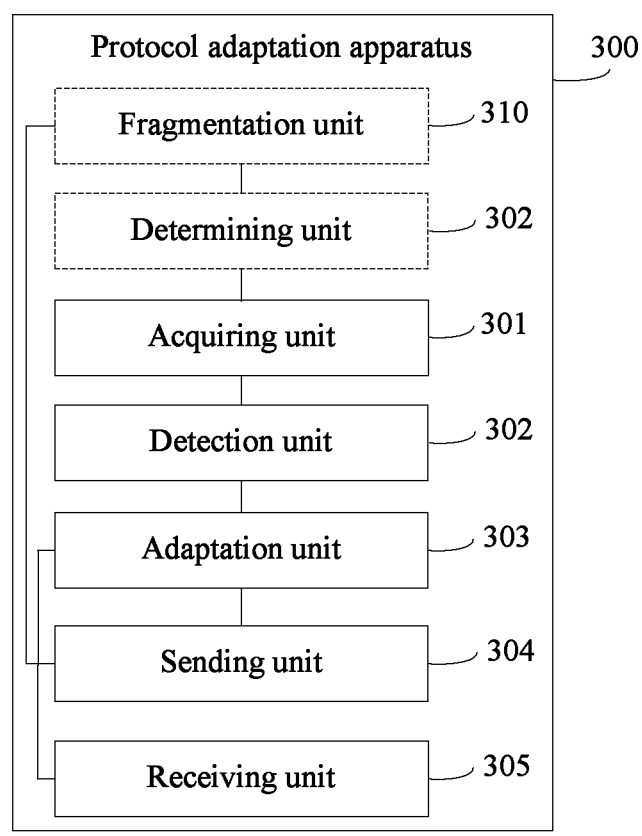
FIG. 6 is a fourth schematic structural diagram of a protocol adaptation apparatus according to an embodiment of the present disclosure.

Further, as shown in FIG. 6, the apparatus 300 further includes a determining unit 307 and a fragmentation unit 310.

The determining unit 307 is configured to: if the first wireless transmission protocol packet does not carry user data, after the detection unit 302 detects whether the first wireless transmission protocol packet carries user data, determine whether a total length of the first wireless transmission protocol packet exceeds a preset transmission length threshold of a data link layer.

The fragmentation unit 310 is configured to: if the total length of the first wireless transmission protocol packet exceeds the preset transmission length threshold, perform IP fragmentation on the first wireless transmission protocol packet.

The sending unit 304 is further configured to send the first wireless transmission protocol packet on which IP fragmentation is performed.

Specifically, for a method for performing protocol adaptation by using the protocol adaptation apparatus, reference may be specifically made to description in Embodiment 2. This embodiment of the present disclosure provides no specific elaboration herein.

Based on the foregoing protocol stack adaptation apparatus provided in this embodiment of the present disclosure, the protocol stack adaptation apparatus can adapt a wireless transmission protocol packet to a standard IP data packet and then send the standard IP data packet to an NTO device for processing, and can adapt a standard IP data packet obtained after the NTO device performs processing to a wireless transmission protocol packet. Therefore, an NTO technology can be deployed in a wireless transmission network, which can reduce bandwidth occupation of data traffic in a wireless network, decrease wireless network and user application latencies, and achieve a purpose of optimizing transmission in the wireless network.

Embodiment 2

Figure 7:
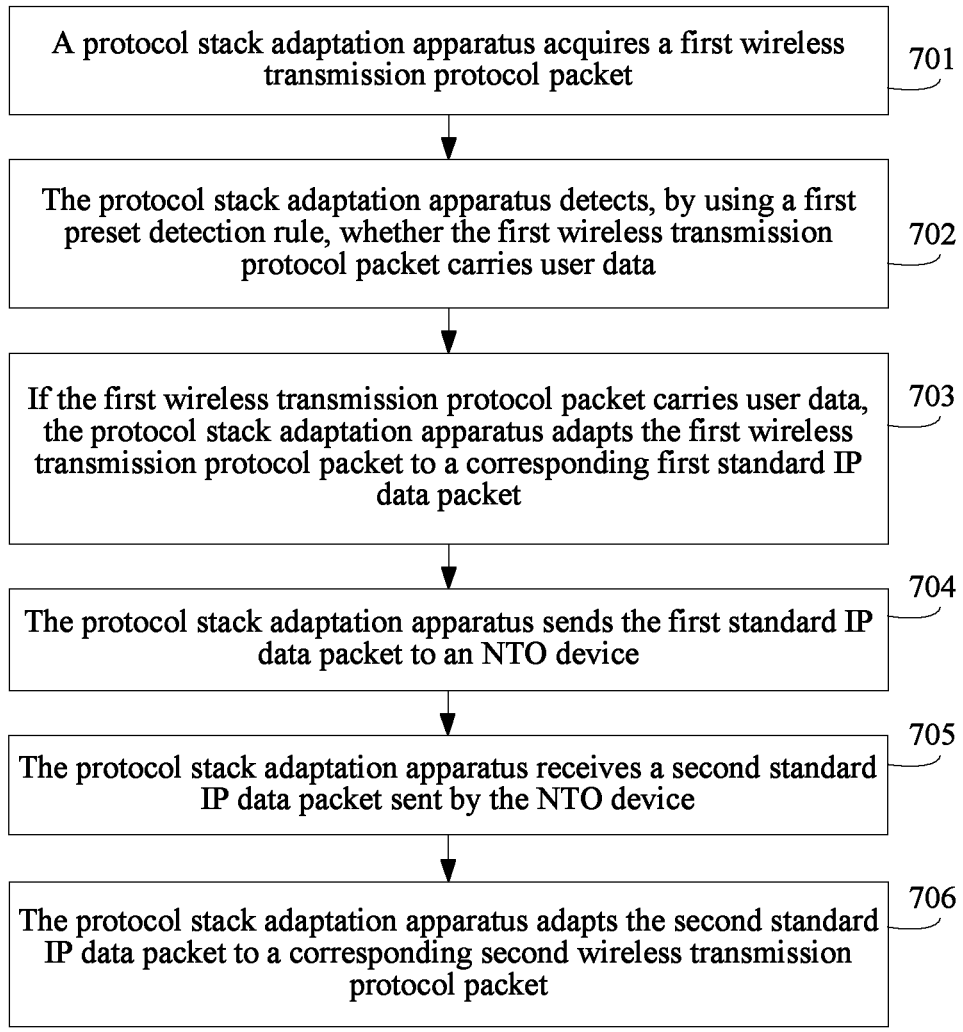
FIG. 7 is a schematic flowchart of a protocol adaptation method according to an embodiment of the present disclosure.

This embodiment of the present disclosure provides a protocol stack adaptation method. Specifically, as shown in FIG. 7, the method includes:

701. A protocol stack adaptation apparatus acquires a first wireless transmission protocol packet.

Specifically, in this embodiment of the present disclosure, the first wireless transmission protocol packet may be a complete protocol packet, or may be multiple IP fragments. This embodiment of the present disclosure imposes no specific limitation thereon, and only describes that the protocol stack adaptation apparatus acquires the first wireless transmission protocol packet.

702. The protocol stack adaptation apparatus detects, by using a first preset detection rule, whether the first wireless transmission protocol packet carries user data.

Specifically, in this embodiment of the present disclosure, if the protocol stack adaptation apparatus detects, by using the first preset detection rule, that the first wireless transmission protocol packet carries user data, step 703 may be further performed; otherwise, step 703 is skipped.

Specially, if first transmission network layer header information of the first wireless transmission protocol packet includes an IP header, a UDP header, and a GTP-U header, the first preset detection rule may be as follows, including:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a G-PDU; and if the message field type of the transmission network layer GTP-U header is the G-PDU, determining that the acquired wireless transmission protocol packet carries user data.

Certainly, there may be another first preset detection rule, and this embodiment of the present disclosure imposes no specific limitation thereon, and only describe that whether the first wireless transmission protocol packet carries user data may be detected by using the first preset detection rule.

703. If the first wireless transmission protocol packet carries user data, the protocol stack adaptation apparatus adapts the first wireless transmission protocol packet to a corresponding first standard IP data packet.

Exemplarily, in this embodiment of the present disclosure, a method for adapting the first wireless transmission protocol packet to the corresponding first standard IP data packet by the protocol stack adaptation apparatus may be as follows:

First, the protocol stack adaptation apparatus parses the IP header and the UDP header of the first wireless transmission protocol packet to acquire a first transmission network layer IP header field and a first transmission network layer UDP header field of the first wireless transmission protocol packet.

Second, the protocol stack adaptation apparatus may parse the first transmission network layer GTP-U header according to the following steps:

(a) A pointer ptr is defined to point to the GTP-U header.

(b) A GTP-U analytic function is invoked to obtain a GTP-U header length gtp_hlen.

(c) The GTP-U header is acquired according to a position of the pointer ptr and the GTP-U header length gtp_hlen, and the pointer ptr is moved backward by gtp_hlen bytes.

(d) At this moment, the pointer ptr has pointed to a header of an IP data packet, at a user data layer, of the first wireless transmission protocol packet. A part from a position of the pointer ptr to the end of the data packet is the first standard IP data packet. A source IP address, a destination IP address, and a protocol type of the user data layer are read. If the protocol type is TCP or UDP, a corresponding source port number and destination port number are read, and a user data layer quintuple may be obtained.

Up to now, the protocol stack adaptation apparatus completes a process of adapting the first wireless transmission protocol packet to the first standard IP data packet.

704. The protocol stack adaptation apparatus sends the first standard IP data packet to an NTO device.

Specifically, after adapting the first wireless transmission protocol packet to the first standard IP data packet, the protocol stack adaptation apparatus sends the first standard IP data packet to the NTO device. The NTO device processes the first standard IP data packet.

Specifically, for a method for performing compression processing on the received first standard IP data packet by the NTO device, reference may be made to the brief introduction of the NTO technology in the preamble of DESCRIPTION OF EMBODIMENTS, and details are not described again in this embodiment of the present disclosure.

705. The protocol stack adaptation apparatus receives a second standard IP data packet sent by the NTO device.

706. The protocol stack adaptation apparatus adapts the second standard IP data packet to a corresponding second wireless transmission protocol packet.

Specifically, in this embodiment of the present disclosure, the protocol stack adaptation apparatus may obtain, by means of reverse deduction and with reference to the similar method for adapting the first wireless transmission protocol packet to the corresponding first standard IP data packet, a method for adapting the second standard IP data packet to the corresponding second wireless transmission protocol packet, that is, adding a GTP-U header, a UDP header, and an IP header of a transmission network layer to the second standard IP data packet in sequence, so as to obtain the second wireless transmission protocol packet. Details are not described again in this embodiment of the present disclosure.

With reference to specific compression and decompression scenarios, the following further elaborates the protocol adaptation method provided in this embodiment of the present disclosure.

Figure 8:
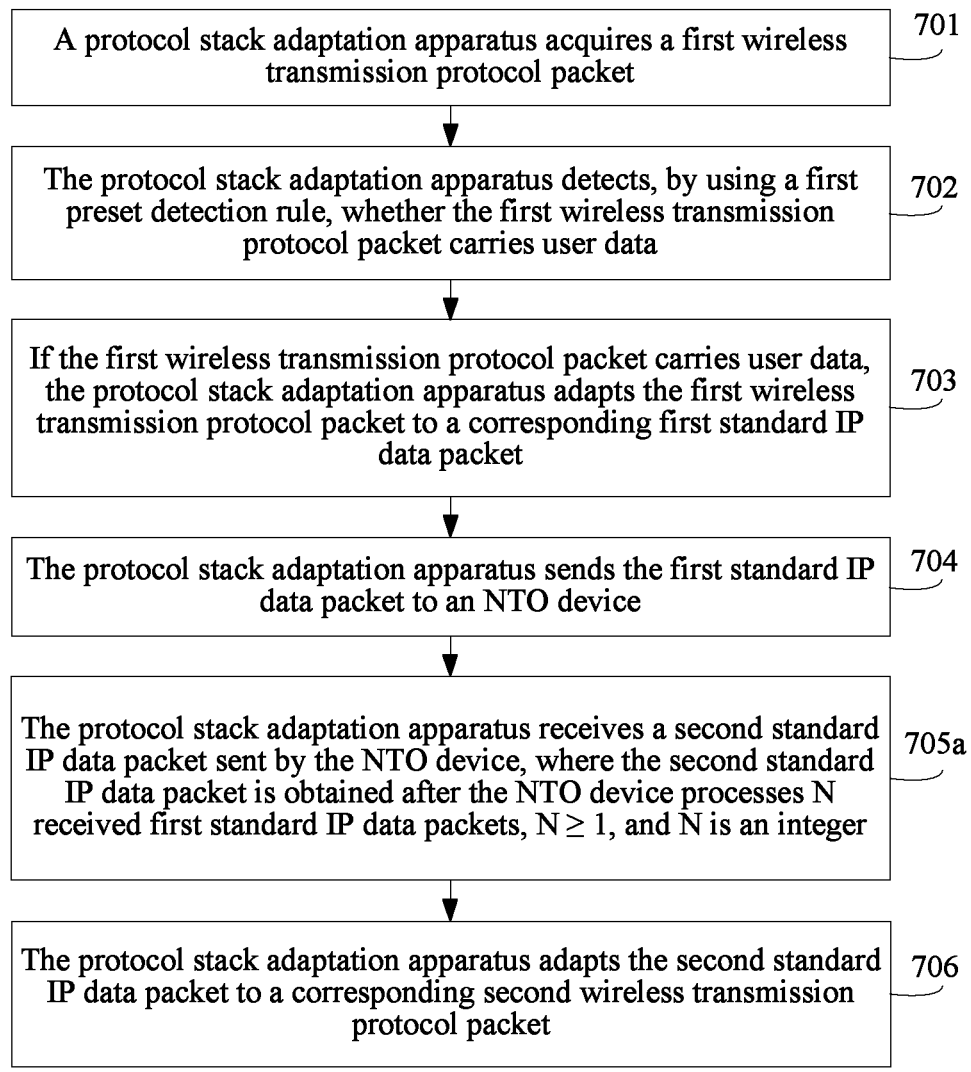
FIG. 8 is a schematic flowchart of a protocol adaptation method in a compression scenario according to an embodiment of the present disclosure.

In a possible scenario, description is provided by using an example in which compression adaptation is performed in an LTE Backhaul user plane protocol stack structure shown in FIG. 2A. That is, if the first wireless transmission protocol packet is a to-be-compressed wireless transmission protocol packet, as shown in FIG. 8, in the protocol adaptation method provided in this embodiment of the present disclosure, step 705, that is, the receiving, by the protocol stack adaptation apparatus, a second standard IP data packet sent by the NTO device, may specifically include:

705a. The protocol stack adaptation apparatus receives the second standard IP data packet sent by the NTO device, where the second standard IP data packet is obtained after the NTO device processes N received first standard IP data packets, N≥1, and N is an integer.

That is, when performing optimization processing on a received standard IP data packet by means of compression, the NTO device may perform optimization on a standard IP data packet separately by means of compression, or may compress and combine multiple standard IP data packets as one standard IP data packet. This embodiment of the present disclosure imposes no specific limitation thereon.

Therefore, in this embodiment of the present disclosure, the second standard IP data packet is obtained after the NTO device processes the N received first standard IP data packets. A value of N may be 1, or may be an integer greater than 1. This embodiment of the present disclosure imposes no specific limitation thereon.

Further, in this scenario, if the first wireless transmission protocol packet carries user data, the method further includes:

acquiring and storing, by the protocol stack adaptation apparatus, a mapping relationship between first transmission network layer header information of the first wireless transmission protocol packet and a quintuple information of the first standard IP data packet.

Specifically, the protocol stack adaptation apparatus may maintain a protocol stack adaptation mapping relationship. The mapping relationship is a mapping relationship between transmission network layer header information of a wireless transmission protocol packet and user data layer quintuple information, and may specifically include the following fields: transmission network layer IP header, transmission network layer UDP header, transmission network layer GTP-U header and length, and user data layer quintuple. The user data layer quintuple includes source IP address, destination IP address, protocol type, source port number, and destination port number fields. The protocol stack adaptation mapping relationship may be implemented by using a GTP-U adaptation table, or may be implemented in another manner. This embodiment of the present disclosure imposes no specific limitation thereon.

In this embodiment of the present disclosure, it is assumed that the protocol stack adaptation mapping relationship is implemented by using the GTP-U adaptation table. After the protocol stack adaptation apparatus performs step 702, if the first wireless transmission protocol packet carries user data, the protocol stack adaptation apparatus acquires a protocol stack adaptation mapping relationship corresponding to the first wireless transmission protocol packet, and stores the protocol stack adaptation mapping to the GTP-U adaptation table.

Exemplarily, it is assumed that first transmission network layer IP headers of three first wireless transmission protocol packets received by the protocol stack adaptation apparatus are IP1, IP2, and IP3 respectively; first transmission network layer UDP headers are UDP1, UDP2, and UDP3 respectively; first transmission network layer GTP-U headers are GTP-U1, GTP-U2, and GTP-U3 respectively; lengths of the first transmission network layer GTP-U headers are L1, L2, and L3 respectively; and user data layer quintuples are S1, S2, and S3. Protocol stack adaptation mapping results shown in Table 3 may be obtained.

TABLE 3

| Transmission network layer IP header | Transmission network layer UDP header | Transmission network layer GTP-U header and length | User data layer quintuple |
|---|---|---|---|
| IP1 | UDP1 | GTP-U1, L1 | S1 |
| IP2 | UDP2 | GTP-U2, L2 | S2 |
| IP3 | UDP3 | GTP-U3, L3 | S3 |

After the protocol stack adaptation apparatus receives the second standard IP data packet sent by the NTO device and before the second standard IP data packet is adapted to the corresponding second wireless transmission protocol packet, the method further includes:

determining, by the protocol stack adaptation apparatus according to quintuple information of the second standard IP data packet and the mapping relationship, N pieces of first transmission network layer header information corresponding to the quintuple information of the second standard IP data packet;

if the N pieces of the first transmission network layer header information include IP headers, UDP headers, and GTP-U headers, and S identifiers of the GTP-U headers in the N pieces of first transmission network layer header information are 1, determining whether transmission network layer session information corresponding to the N pieces of first transmission network layer header information is stored, where the transmission network layer session information includes a GTP-U serial number;

if the transmission network layer session information corresponding to the N pieces of first transmission network layer header information is stored, increasing the GTP-U serial number in the transmission network layer session information corresponding to the N pieces of first transmission network layer header information by 1; or if no transmission network layer session information corresponding to the N pieces of first transmission network header information is stored, storing the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information; and determining, according to the GTP-U serial number in the transmission network layer session information corresponding to the N pieces of first transmission network layer header information and the N pieces of first transmission network layer header information, transmission network layer header information corresponding to the second standard IP data packet.

Exemplarily, it is assumed that the second standard IP data packet is obtained after the NTO device processes two received first standard IP data packets, that is, N=2, and that protocol stack adaptation mapping relationship of first wireless transmission protocol packets corresponding to the two first standard IP data packets are respectively shown by first two rows of mapping results in Table 3. In this case, after receiving the second standard IP data packet sent by the NTO device, the protocol stack adaptation apparatus may specifically perform the following steps:

(a) A pointer ptr is defined to point to a header of the second standard IP data packet; a source IP address, a destination IP address, and a protocol type of the second standard IP data packet are read; if the protocol type is TCP or UDP, a corresponding source port number and destination port number are read to obtain quintuple information of the second standard IP data packet; and then the mapping relationship shown in Table 3 is searched according to the quintuple information of the second standard IP data packet, so as to obtain two pieces of first transmission network layer header information corresponding to the second standard IP data packet: a transmission network layer IP header is the IP1, a transmission network layer UDP header is UDP1, and a transmission network layer GTP-U header is GTP-U1; and a transmission network layer IP header is IP2, a transmission network layer UDP header is UDP2, and a transmission network layer GTP-U header is GTP-U2 respectively.

It should be noted that an essential condition for the NTO device to compress and combine multiple standard IP data packets as one standard IP data packet is that quintuple information of the multiple standard IP data packets is the same. Quintuple information of the standard IP data packet obtained by means of combination is any quintuple information in the quintuple information of the original multiple standard IP data packets. The quintuple information of the multiple standard IP data packets corresponds to multiple protocol stack adaptation mapping relationships. Therefore, multiple protocol stack adaptation mapping relationships may be obtained by searching a pre-stored mapping relationship according to the quintuple information of the second standard IP data packet.

(b) This embodiment of the present disclosure is applied to the LTE Backhaul user plane protocol stack structure shown in FIG. 2A. Therefore, the two first transmission network layer headers determined in step (a) include IP headers, UDP headers, and GTP-U headers. If S identifiers of the GTP-U headers are 1, it can be learned according to the GTP-U header structure described in Table 1 that GTP-U serial numbers of the GTP-U headers are valid in this case. In order to ensure that a serial number of a second wireless transmission protocol packet finally obtained by means of protocol stack adaptation is continuous, and therefore can be correctly detected by a receive end, a GTP-U serial number of the second wireless transmission protocol packet, obtained by means of compression and combination by the NTO device and by means of adaptation by the protocol stack adaptation apparatus, needs to be updated. Therefore, the protocol stack adaptation apparatus determines whether transmission network layer session information corresponding to the determined two pieces of first transmission network layer header information is stored, where the transmission network layer session information includes a GTP-U serial number.

It should be noted that the protocol stack adaptation apparatus may maintain one piece of transmission network layer session information, where the session information is used for session management of a wireless transmission protocol, and includes a GTP-U serial number field. Certainly, the transmission network layer session information may further include the following fields: destination IP address of a transmission network layer IP header, TEID of a GTP-U header, and the like. This embodiment of the present disclosure imposes no specific limitation thereon.

Exemplarily, it is assumed that the transmission network layer session information includes the foregoing listed fields. The transmission network layer session information may be implemented by using a GTP-U session table shown in Table 4. Certainly, the session information may also be implemented in another manner. This embodiment of the present disclosure imposes no specific limitation thereon.

TABLE 4

| Destination IP address of a transmission network layer IP header | TEID of a GTP-U header | GTP-U serial number |
| --- | --- | --- |
| Address1 | TEID1 | P1 |
| Address2 | TEID2 | P2 |
| Address3 | TEID3 | P3 |

Address1, Address2, and Address3 indicate destination IP addresses at a transmission network layer; TEID1, TEID2, and TEID3 indicate TEIDs of GTP-U headers; P1, P2, and P3 indicate values of GTP-U serial numbers.

It should be noted that if the NTO device can compress and combine multiple standard IP data packets as one standard IP data packet, destination IP addresses of transmission network layer IP header fields in multiple mapping relationships corresponding to the multiple standard IP data packets are the same, and TEIDs of transmission network layer UDP headers are the same. Therefore, destination addresses of the IP headers and TEIDs of the UDP headers of the two first transmission network layer headers determined in step (a) may be read, and session information may be retrieved, so as to determine whether the transmission network layer session information corresponding to the determined two pieces of first transmission network layer header information is stored.

(c) Exemplarily, if the transmission network layer session information corresponding to the determined two pieces of first transmission network layer header information is stored, that is, assuming that in Table 3, destination IP addresses of IP1 and IP2 both are Address1, and TEIDs of UDP1 and UDP2 both are TEID1, in this case, a value of P1 is increased by 1, and updated P1 is used as a serial number of a re-encapsulated GTP-U header.

In this case, the transmission network layer header information corresponding to the second standard IP data packet is that a transmission network layer IP header is IP1 (IP2), a transmission network layer UDP header is UDP1 (UDP2), and a transmission network layer GTP-U header is GTP-U1

(GTP-U2), where a GTP-U serial number of the GTP-U header of the second standard IP data packet is updated P1.

(d) Exemplarily, if no transmission network layer session information corresponding to the determined two pieces of first transmission network layer header information is stored, that is, assuming that in Table 3, destination IP addresses of IP1 and IP2 both are Address4, and TEIDs of UDP1 and UDP2 both are TEID4, in this case, the transmission network layer session information corresponding to the determined two pieces of first transmission network layer header information needs to be added to Table 4, as shown in Table 5.

TABLE 5

| Destination IP address of a transmission network layer IP header | TEID of a GTP-U header | GTP-U serial number |
|---|---|---|
| Address1 | TEID1 | P1 |
| Address2 | TEID2 | P2 |
| Address3 | TEID3 | P3 |
| Address4 | TEID4 | P4 |

P4 is a smaller serial number of GTP-U serial numbers in GTP-U1 and GTP-U2 headers, and P4 is used as a serial number of a re-encapsulated GTP-U header.

The transmission network layer header information corresponding to the second standard IP data packet is that a transmission network layer IP header is IP1 (IP2), a transmission network layer UDP header is UDP1 (UDP2), and a transmission network layer GTP-U header is GTP-U1 (GTP-U2), where a GTP-U serial number of the GTP-U header of the second standard IP data packet is P4.

It should be noted that when the second standard IP data packet is adapted to the second wireless transmission protocol packet, any transmission network layer header of multiple transmission network layer headers in multiple mapping relationships corresponding to the second standard IP data packet may be used as a transmission network layer header of the second standard IP data packet, where the GTP-U serial number of the GTP-U header of the second standard IP data packet may be determined in the foregoing manner. Certainly, some other information such as a GTP-U header length, a UDP header length, a UDP checksum, an IP header length, and an IP header checksum in the transmission network layer header information of the second standard IP data packet may also need to be updated. For details, reference may be made to a method for calculating related values in the prior art, and this embodiment of the present disclosure provides no specific elaboration or limitation thereon.

It should be noted that after the second standard IP data packet is adapted to the second wireless transmission protocol packet, all protocol stack adaptation mapping relationships corresponding to the second standard IP data packet may be deleted, which can reduce storage resources of a system. This embodiment of the present disclosure imposes no specific limitation thereon.

Further, in this scenario, in the protocol stack adaptation method provided in this embodiment of the present disclosure, before the adapting the second standard IP data packet to a corresponding second wireless transmission protocol packet, the method may further include:

if a destination port number of a UDP header in transmission network layer header information corresponding to the second standard IP data packet is a GTP-U port number, updating, by the protocol stack adaptation apparatus, the GTP-U port number to a WNTO port number, where the WNTO port number represents that the corresponding standard IP data packet has been optimized by means of compression.

In this way, when receiving the second wireless transmission protocol packet, a protocol stack adaptation apparatus corresponding to a decompression side may directly determine, according to the WNTO port number of the second wireless transmission protocol packet, that the second wireless transmission protocol packet is a wireless transmission protocol packet obtained after optimization by means of compression, which improves detection efficiency of the protocol stack adaptation apparatus, and therefore can improve wireless transmission efficiency.

Figure 9:
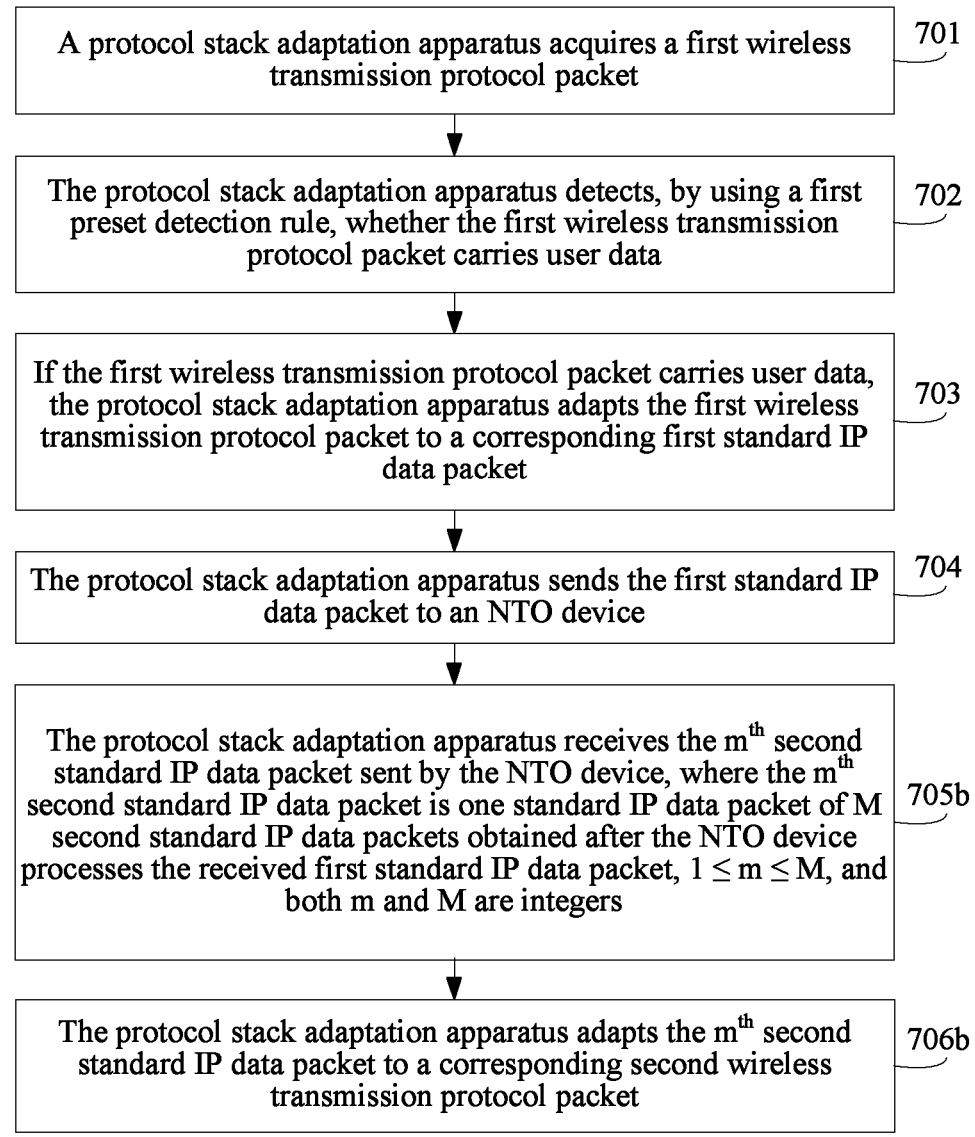
FIG. 9 is a schematic flowchart of a protocol adaptation method in a decompression scenario according to an embodiment of the present disclosure.

In another possible scenario, description is provided by using an example in which decompression adaptation is performed in an LTE Backhaul user plane protocol stack structure shown in FIG. 2A. That is, if the first wireless transmission protocol packet is a to-be-decompressed wireless transmission protocol packet, as shown in FIG. 9, in the protocol adaptation method provided in this embodiment of the present disclosure, step 705, that is, the receiving, by the protocol stack adaptation apparatus, a second standard IP data packet sent by the NTO device, may specifically include:

705b. The protocol stack adaptation apparatus receives the $m^{th}$ second standard IP data packet sent by the NTO device, where the $m^{th}$ second standard IP data packet is one standard IP data packet of M second standard IP data packets obtained after the NTO device processes the received first standard IP data packet, $1 \leq m \leq M$, and both m and M are integers.

It should be noted that when the NTO device performs decompression and restoration processing on a received standard IP data packet, the received standard IP data packet may be decompressed and restored as one standard IP data packet, or the standard IP data packet to be decompressed and restored may be split into multiple standard IP data packets. This embodiment of the present disclosure imposes no specific limitation thereon.

Therefore, in this embodiment of the present disclosure, the M second standard IP data packets are obtained after the NTO device processes the received first standard IP data packet. A value of M may be 1, or may be an integer greater than 1. This embodiment of the present disclosure imposes no specific limitation thereon. Assuming that M=3, a value of m may be 1, 2, or 3, that is, the protocol stack adaptation apparatus receives the $1^{st}$ second standard IP data packet, the $2^{nd}$ second standard IP data packet, and the $3^{rd}$ second standard IP data packet in sequence.

Step 706, that is, the adapting, by the protocol stack adaptation apparatus, the second standard IP data packet to a corresponding second wireless transmission protocol packet, may specifically include:

706b. The protocol stack adaptation apparatus adapts the $m^{th}$ second standard IP data packet to the corresponding second wireless transmission protocol packet.

Further, in this scenario, if the first wireless transmission protocol packet carries user data, the method further includes:

acquiring and storing a mapping relationship between first transmission network layer header information of the first wireless transmission protocol packet and quintuple information of the first standard IP data packet; and after the receiving the $m^{th}$ second standard IP data packet sent by the NTO device and before the adapting the $m^{th}$ second standard IP data packet to the corresponding second wireless transmission protocol packet, the method further includes:

determining, according to quintuple information of the $m^{th}$ second standard IP data packet and the mapping relationship, first transmission network layer header information corresponding to the quintuple information of the $m^{th}$ second standard IP data packet;

if the first transmission network layer header information includes an IP header, a UDP header, and a GTP-U header, and an S identifier of the GTP-U header in the first transmission network layer header information is 1, determining whether transmission network layer session information corresponding to the first transmission network layer header information is stored, where the transmission network layer session information includes a GTP-U serial number;

if the transmission network layer session information corresponding to the first transmission network header information is stored, increasing the GTP-U serial number in the transmission network layer session information corresponding to the first transmission network header information by 1; or if no transmission network layer session information corresponding to the first transmission network header information is stored, storing the transmission network layer session information corresponding to the first transmission network header information, where the GTP-U serial number in the transmission network layer session information is a GTP-U serial number of the GTP-U header in the first transmission network header information; and determining, according to the GTP-U serial number in the transmission network layer session information corresponding to the first transmission network header information, and the first transmission network header information, transmission network layer header information corresponding to the $m^{th}$ second standard IP data packet.

Specifically, in the foregoing decompression process, for a session management process when the S identifier is 1, reference may be made to the session management process when the S identifier is 1 in the compression process, and details are not described herein again.

Exemplarily, it is assumed that M=2, m=1, and a protocol stack adaptation mapping of the first wireless transmission protocol packet corresponding to the first standard IP data packet is shown by the first row of mapping result in Table 3. In this case, after receiving the $1^{st}$ second standard IP data packet (the $1^{st}$ second standard IP data packet is recorded as W1) sent by the NTO device, the protocol stack adaptation apparatus may specifically perform the following steps:

(a) A pointer ptr is defined to point to a header of W1; a source IP address, a destination IP address, and a protocol type of W1 are read; if the protocol type is TCP or UDP, a corresponding source port number and destination port number are read to obtain quintuple information of W1; and then the mapping relationship shown in Table 3 is searched according to the quintuple information of W1, so as to obtain first transmission network layer header information corresponding to W1: a transmission network layer IP header is IP1, a transmission network layer UDP header is UDP1, and a transmission network layer GTP-U header is GTP-U1.

(b) This embodiment of the present disclosure is applied to the LTE Backhaul user plane protocol stack structure shown in FIG. 2A. Therefore, the first transmission network layer header determined in step (a) includes an IP header, a UDP header, and a GTP-U header. If an S identifier of the GTP-U header is 1, it can be learned according to the GTP-U header structure described in Table 1 that a GTP-U serial number of the GTP-U header is valid in this case. In order to ensure that a serial number of a second wireless transmission protocol packet finally obtained by means of protocol stack adaptation is continuous, and therefore can be correctly detected by a receive end, a GTP-U serial number of the second wireless transmission protocol packet, obtained by means of decompression and restoration by the NTO device and by means of adaptation by the protocol stack adaptation apparatus, needs to be updated. Therefore, the protocol stack adaptation apparatus determines whether transmission network layer session information corresponding to the determined first transmission network layer header information is stored, where the transmission network layer session information includes a GTP-U serial number.

For related description of the transmission network layer session information, reference may be made to the foregoing embodiment, and details are not described herein again.

(c) Exemplarily, if the transmission network layer session information corresponding to the determined first transmission network layer header information is stored, that is, assuming that in Table 3, a destination IP address of IP1 is Address1, and a TEID of UDP1 is TEID1, in this case, a value of P1 is increased by 1, and updated P1 is used as a serial number of a re-encapsulated GTP-U header.

In this case, transmission network layer header information corresponding to W1 is that a transmission network layer IP header is IP1, a transmission network layer UDP header is UDP1, and a transmission network layer GTP-U header is GTP-U1, where a GTP-U serial number of the GTP-U header of W1 is updated P1.

When m=2, the $2^{nd}$ second standard IP data packet may be processed by using a method similar to steps (a) to (c), and details are not described herein again.

(d) Exemplarily, if no transmission network layer session information corresponding to the determined first transmission network layer header information is stored, that is, assuming that in Table 3, a destination IP address of IP1 is Address4, and a TEID of UDP1 is TEID4, in this case, the transmission network layer session information corresponding to the determined first transmission network layer header information needs to be added to Table 4, as shown in Table 5. P4 is a GTP-U serial number in the GTP-U1 header.

In this case, transmission network layer header information corresponding to W1 is that a transmission network layer IP header is IP1, a transmission network layer UDP header is UDP1, and a transmission network layer GTP-U header is GTP-U1, where a GTP-U serial number of the GTP-U header of W1 is P4.

When m=2, after the $2^{nd}$ second standard IP data packet is processed by using a method similar to step (a) and step (b), if it is determined that transmission network layer session information corresponding to the determined first transmission network layer header information, that is, the $4^{th}$ piece of session information in Table 5, is stored, in this case, a value of P4 is increased by 1, and updated P4 is used as a serial number of a re-encapsulated GTP-U header.

As described above, some other information such as a GTP-U header length, a UDP header length, a UDP checksum, an IP header length, and an IP header checksum in the transmission network layer header information of the $m^{th}$ second standard IP data packet may also need to be updated. For details, reference may be made to a method for calculating related values in the prior art, which is not specifically elaborated or limited herein.

As described above, after the $m^{th}$ second standard IP data packet is adapted to the corresponding second wireless transmission protocol packet, a protocol stack adaptation mapping relationship corresponding to the m$^{th}$ second standard IP data packet may be deleted, which can reduce storage resources of a system. This embodiment of the present disclosure imposes no specific limitation thereon.

Further, in this scenario, in the protocol stack adaptation method provided in this embodiment of the present disclosure, before the adapting the m$^{th}$ second standard IP data packet to a corresponding second wireless transmission protocol packet, the method may further include:

if a destination port number of a UDP header in the transmission network layer header information corresponding to the m$^{th}$ second standard IP data packet is a WNTO port number, updating the WNTO port number to a GTP-U port number, where the WNTO port number represents that the corresponding standard IP data packet has been optimized by means of compression.

That is, during decompression, a tag indicating optimization by means of compression and labeled during optimization by means of compression needs to be removed, for example, a WNTO port number is updated to an original GTP-U port number, so as to ensure that a subsequent wireless transmission process can be performed smoothly.

Further, if each wireless transmission protocol packet obtained after optimization by means of compression is labeled with a tag indicating optimization by means of compression, for example, a destination port number of a UDP header in a transmission network layer header of the wireless transmission protocol packet obtained after optimization by means of compression is a WNTO port number, the first preset detection rule may be as follows, including:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

By using the LTE Backhaul user plane protocol stack structure shown in FIG. 2A as an example, in the embodiment shown in FIG. 8 and FIG. 9, a protocol adaptation method in a compression scenario and a protocol adaption method in a decompression scenario are described respectively. Certainly, the protocol adaptation method provided in this embodiment of the present disclosure may also be applicable to another network element whose protocol stack structure is the same as or similar to the LTE Backhaul user plane protocol stack structure. This embodiment of the present disclosure imposes no specific limitation thereon.

Further, this embodiment of the present disclosure further provides a processing method applicable when the first wireless transmission protocol packet does not carry user data. That is, after the detecting whether the first wireless transmission protocol packet carries user data, the method may further include:

if the first wireless transmission protocol packet does not carry user data, determining whether a total length of the first wireless transmission protocol packet exceeds a preset transmission length threshold of a data link layer;

if the total length of the first wireless transmission protocol packet exceeds the preset transmission length threshold, performing IP fragmentation on the first wireless transmission protocol packet; and sending the first wireless transmission protocol packet on which IP fragmentation is performed.

In this way, the protocol stack adaptation apparatus may classify all acquired wireless transmission protocol packets, which not only achieves a purpose of optimizing a wireless transmission network, but also ensures that all the wireless transmission protocol packets can be normally transmitted, so that wireless transmission quality is ensured.

Figure 10:
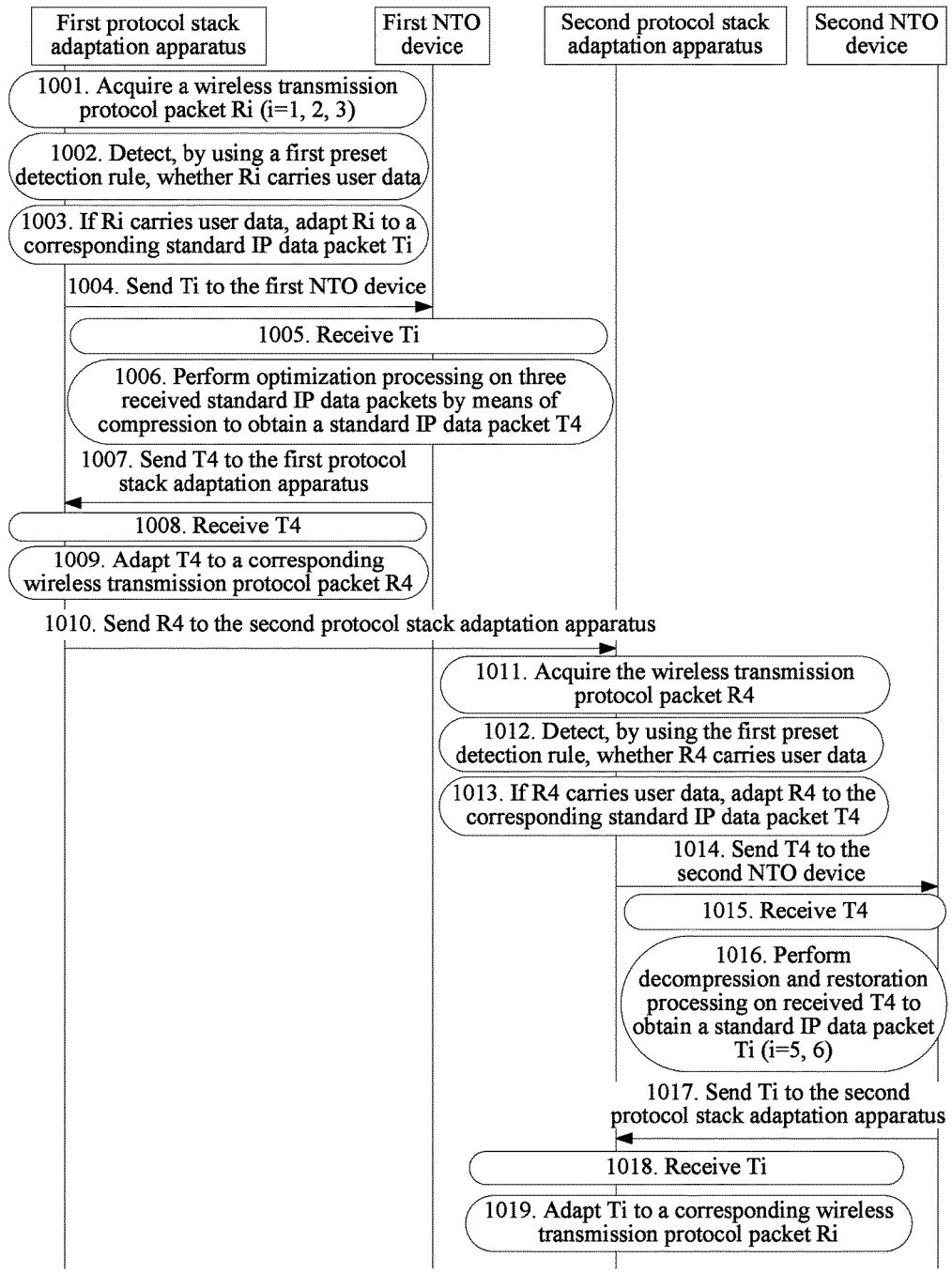
FIG. 10 is a schematic interactive diagram of a protocol adaptation method according to an embodiment of the present disclosure.

The following still uses the LTE Backhaul user plane protocol stack structure shown in FIG. 2A as an example. It is assumed that: a protocol stack adaptation apparatus corresponding to a base station side is a first protocol stack adaptation apparatus, and an NTO device is a first NTO device; a protocol stack adaptation apparatus corresponding to an SGW side is a second protocol stack adaptation apparatus, and an NTO device is a second NTO device; and N=3, and M=2. As shown in FIG. 10, a complete protocol stack adaptation process of sending a first wireless transmission protocol packet by a base station to an SGW is described in detail as follows:

1001. The first protocol stack adaptation apparatus acquires a wireless transmission protocol packet Ri (i=1, 2, 3).

1002. The first protocol stack adaptation apparatus detects, by using a first preset detection rule, whether Ri carries user data.

1003. If Ri carries user data, the first protocol stack adaptation apparatus adapts Ri to a corresponding standard IP data packet Ti.

1004. The first protocol stack adaptation apparatus sends Ti to the first NTO device.

1005. The first NTO device receives Ti.

It should be noted that in this example, i=1, 2, 3 is set in sequence in step 1001 to step 1005. Step 1001 to step 1005 are repeatedly performed till the first NTO device receives N=3 standard IP data packets T1, T2, and T3.

1006. The first NTO device performs optimization processing on the three received standard IP data packets by means of compression, to obtain a standard IP data packet T4.

1007. The first NTO device sends T4 to the first protocol stack adaptation apparatus.

1008. The first protocol stack adaptation apparatus receives T4 sent by the first NTO device.

1009. The first protocol stack adaptation apparatus adapts T4 to a corresponding wireless transmission protocol packet R4.

1010. The first protocol stack adaptation apparatus sends R4 to the second protocol stack adaptation apparatus.

It should be noted that according to different deployment positions of the first protocol stack adaptation apparatus and the second protocol stack adaptation apparatus, the first protocol stack adaptation apparatus may send the wireless transmission protocol packet R4 to the second protocol stack adaptation apparatus by using some unit modules instead of directly sending the wireless transmission protocol packet. This example imposes no specific limitation thereon, and describes that the wireless transmission protocol packet R2 is sent to the second protocol stack adaptation apparatus via the first protocol stack adaptation apparatus.

1011. The second protocol stack adaptation apparatus acquires the wireless transmission protocol packet R4.

1012. The second protocol stack adaptation apparatus detects, by using the first preset detection rule, whether R4 carries user data.

1013. If R4 carries user data, the second protocol stack adaptation apparatus adapts R4 to the corresponding standard IP data packet T4.

1014. The second protocol stack adaptation apparatus sends T4 to the second NTO device.

1015. The second NTO device receives T4.

1016. The second NTO device performs decompression and restoration processing on received T4 to obtain a standard IP data packet Ti (i=5, 6).

1017. The second NTO device sends Ti to the second protocol stack adaptation apparatus.

1018. The second protocol stack adaptation apparatus receives Ti sent by the second NTO device.

1019. The second protocol stack adaptation apparatus adapts Ti to a corresponding wireless transmission protocol packet Ri.

Set i=5, 6 in sequence in step 1017 to step 1019. Step 1017 to step 1019 are repeatedly performed till the second protocol stack adaptation apparatus adapts M=2 standard IP data packets to wireless transmission protocol packets R5 and R6 respectively. Up to now, a complete protocol stack adaptation process ends.

Specifically, for related description of step 1001 to step 1019, reference may be made to the description in the embodiment shown in FIG. 7 to FIG. 9, and details are not described in this embodiment of the present disclosure again.

Based on the foregoing protocol stack adaptation method provided in this embodiment of the present disclosure, a protocol stack adaptation apparatus can adapt a wireless transmission protocol packet to a standard IP data packet and then send the standard IP data packet to an NTO device for processing, and can adapt a standard IP data packet obtained after the NTO device performs processing to a wireless transmission protocol packet. Therefore, an NTO technology can be deployed in a wireless transmission network, which can reduce bandwidth occupation of data traffic in a wireless network, decrease wireless network and user application latencies, and achieve a purpose of optimizing transmission in the wireless network.

Embodiment 3

Figure 11:
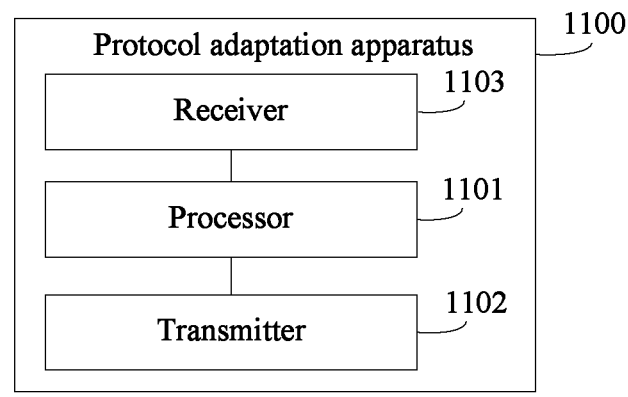
FIG. 11 is a fifth schematic structural diagram of a protocol adaptation apparatus according to an embodiment of the present disclosure.

This embodiment of the present disclosure provides a protocol stack adaptation apparatus 1100. Specifically, as shown in FIG. 11, the apparatus 1100 includes: a processor 1101, a transmitter 1102, and a receiver 1103.

The processor 1101 is configured to acquire a first wireless transmission protocol packet.

The processor 1101 is further configured to detect, by using a first preset detection rule, whether the first wireless transmission protocol packet carries user data.

Specially, if first transmission network layer header information of the first wireless transmission protocol packet includes an IP header, a UDP header, and a GTP-U header, the first preset detection rule may include:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a G-PDU; and if the message field type of the transmission network layer GTP-U header is the G-PDU, determining that the acquired wireless transmission protocol packet carries user data.

Certainly, there may be another first preset detection rule, and this embodiment of the present disclosure imposes no specific limitation thereon.

The processor 1101 is further configured to: if the first wireless transmission protocol packet carries user data, adapt the first wireless transmission protocol packet to a corresponding first standard Internet Protocol IP data packet.

The transmitter 1102 is configured to send the first standard IP data packet to a network transmission optimization NTO device.

The receiver 1103 is configured to receive a second standard IP data packet sent by the NTO device.

The processor 1101 is further configured to adapt the second standard IP data packet to a corresponding second wireless transmission protocol packet.

In a possible implementation manner, if the first wireless transmission protocol packet is a to-be-compressed wireless transmission protocol packet, the receiver 1103 is specifically configured to:

receive the second standard IP data packet sent by the NTO device, where the second standard IP data packet is obtained after the NTO device processes N received first standard IP data packets, N≥1, and N is an integer.

Figure 12:
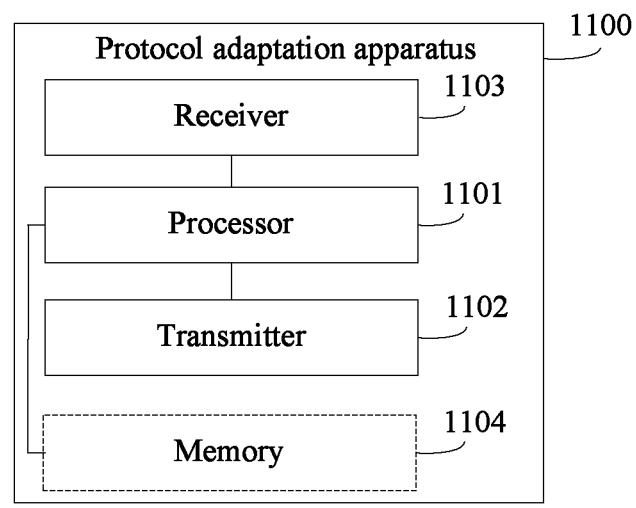
FIG. 12 is a sixth schematic structural diagram of a protocol adaptation apparatus according to an embodiment of the present disclosure.

Further, as shown in FIG. 12, the apparatus 1100 further includes a memory 1104.

The processor 1101 is further configured to: if the first wireless transmission protocol packet carries user data, acquire a mapping relationship between first transmission network layer header information of the first wireless transmission protocol packet and quintuple information of the first standard IP data packet.

The memory 1104 is configured to store the mapping relationship.

The processor 1101 is further configured to: after the receiver 1103 receives the second standard IP data packet sent by the NTO device and before the second standard IP data packet is adapted to the corresponding second wireless transmission protocol packet, determine, according to quintuple information of the second standard IP data packet and the mapping relationship, N pieces of first transmission network layer header information corresponding to the quintuple information of the second standard IP data packet.

The processor 1101 is further configured to: if the N pieces of the first transmission network layer header information include IP headers, User Datagram Protocol UDP headers, and general packet radio service technology GPRS Tunneling Protocol-User Plane GTP-U headers, and S identifiers of the GTP-U headers in the N pieces of first transmission network layer header information are 1, determine whether transmission network layer session information corresponding to the N pieces of first transmission network layer header information is stored, where the transmission network layer session information includes a GTP-U serial number.

The processor 1101 is further configured to: if the memory 1104 stores the transmission network layer session information corresponding to the N pieces of first transmission network layer header information, increase the GTP-U serial number in the transmission network layer session information corresponding to the N pieces of first transmission network layer header information by 1.

The memory 1104 is further configured to: if no transmission network layer session information corresponding to the N pieces of first transmission network header information is stored, store the transmission network layer session information corresponding to the N pieces of first transmission network layer header information, where the GTP-U serial number in the transmission network layer session information is a minimum serial number of GTP-U serial numbers of the GTP-U headers in the N pieces of first transmission network layer header information.

The processor 1101 is further configured to determine, according to the GTP-U serial number in the transmission network layer session information corresponding to the N pieces of first transmission network header information and the N pieces of first transmission network header information, transmission network layer header information corresponding to the second standard IP data packet.

Further, the processor 1101 is further configured to: if a destination port number of a UDP header in transmission network layer header information corresponding to the second standard IP data packet is a GTP-U port number, update the GTP-U port number to a wireless network transmission optimization WNTO port number before adapting the second standard IP data packet to the corresponding second wireless transmission protocol packet, where the WNTO port number represents that the corresponding standard IP data packet has been optimized by means of compression.

In another possible implementation manner, if the first wireless transmission protocol packet is a to-be-decompressed wireless transmission protocol packet, the receiver 1103 is specifically configured to:

receive the $m^{th}$ second standard IP data packet sent by the NTO device, where the $m^{th}$ second standard IP data packet is one standard IP data packet of M second standard IP data packets obtained after the NTO device processes the received first standard IP data packet, $1 \leq m \leq M$, and both m and M are integers.

The processor 1101 is specifically configured to:

adapt the $m^{th}$ second standard IP data packet to the corresponding second wireless transmission protocol packet.

Further, as shown in FIG. 12, the apparatus 1100 further includes a memory 1104.

The processor 1101 is further configured to: if the first wireless transmission protocol packet carries user data, acquire a mapping relationship between first transmission network layer header information of the first wireless transmission protocol packet and quintuple information of the first standard IP data packet.

The memory 1104 is configured to store the mapping relationship.

The processor 1101 is further configured to: after the receiver 1103 receives the $m^{th}$ second standard IP data packet sent by the NTO device and before the $m^{th}$ second standard IP data packet is adapted to the corresponding second wireless transmission protocol packet, determine, according to quintuple information of the $m^{th}$ second standard IP data packet and the mapping relationship, first transmission network layer header information corresponding to the quintuple information of the $m^{th}$ second standard IP data packet.

The processor 1101 is further configured to: if the first transmission network layer header information includes an IP header, a UDP header, and a GTP-U header, and an S identifier of the GTP-U header in the first transmission network layer header information is 1, determine whether transmission network layer session information corresponding to the first transmission network layer header information is stored, where the transmission network layer session information includes a GTP-U serial number.

The processor 1101 is further configured to: if the memory 1104 stores the transmission network layer session information corresponding to the first transmission network header information, increase the GTP-U serial number in the transmission network layer session information corresponding to the first transmission network header information by 1.

The memory 1104 is further configured to: if no transmission network layer session information corresponding to the first transmission network header information is stored, store the transmission network layer session information corresponding to the first transmission network header information, where the GTP-U serial number in the transmission network layer session information is a GTP-U serial number of the GTP-U header in the first transmission network header information.

The processor 1101 is further configured to determine, according to the GTP-U serial number in the transmission network layer session information corresponding to the first transmission network header information, and the first transmission network header information, transmission network layer header information corresponding to the $m^{th}$ second standard IP data packet.

Further, the processor 1101 is further configured to: if a destination port number of a UDP header in the transmission network layer header information corresponding to the $m^{th}$ second standard IP data packet is a WNTO port number, update the WNTO port number to a GTP-U port number before adapting the $m^{th}$ second standard IP data packet to the corresponding second wireless transmission protocol packet, where the WNTO port number represents that the corresponding standard IP data packet has been optimized by means of compression.

Specially, in this case, if the first transmission network layer header information of the first wireless transmission protocol packet includes an IP header, a UDP header, and a GTP-U header, the first preset detection rule may include:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

Further, the processor 1101 is further configured to: if the first wireless transmission protocol packet does not carry user data, after detecting whether the first wireless transmission protocol packet carries user data, determine whether a total length of the first wireless transmission protocol packet exceeds a preset transmission length threshold of a data link layer.

The processor 1101 is further configured to: if the total length of the first wireless transmission protocol packet exceeds the preset transmission length threshold, perform IP fragmentation on the first wireless transmission protocol packet.

The transmitter 1102 is further configured to send the first wireless transmission protocol packet on which IP fragmentation is performed.

Specifically, for a method for performing protocol adaptation by using the protocol adaptation apparatus, reference may be specifically made to description in Embodiment 2. This embodiment of the present disclosure provides no specific elaboration herein.

Based on the foregoing protocol stack adaptation apparatus provided in this embodiment of the present disclosure, the protocol stack adaptation apparatus can adapt a wireless transmission protocol packet to a standard IP data packet and then send the standard IP data packet to an NTO device for processing, and can adapt a standard IP data packet obtained after the NTO device performs processing to a wireless transmission protocol packet. Therefore, an NTO technology can be deployed in a wireless transmission network, which can reduce bandwidth occupation of data traffic in a wireless network, decrease wireless network and user application latencies, and achieve a purpose of optimizing transmission in the wireless network.

It may be clearly learned by a person skilled in the art that, for the purpose of convenient and brief description, in the apparatus described above, division of the foregoing function modules is used as an example for description. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A protocol stack adaptation apparatus, comprising:
a processor;
a transmitter; and
a receiver,
wherein the processor is configured to:
acquire a first wireless transmission protocol packet;
detect, based on a first preset detection rule, whether the first wireless transmission protocol packet carries user data; and
in response to detecting that the first wireless transmission protocol packet carries user data, adapt the first wireless transmission protocol packet to a corresponding first standard Internet Protocol (IP) data packet;
wherein the transmitter is configured to send the first standard IP data packet to a network transmission optimization (NTO) device, wherein the first wireless transmission protocol packet is a to-be-compressed wireless transmission protocol packet;
wherein the receiver is configured to receive a second standard IP data packet sent by the NTO device, wherein the second standard IP data packet is obtained after the NTO device processes N received first standard IP data packets, N≥1, and N is an integer;

wherein the processor is further configured to adapt the second standard IP data packet to a corresponding second wireless transmission protocol packet; and
wherein the processor is further configured to:
  determine that a destination port number of a UDP header in transmission network layer header information corresponding to the second standard IP data packet is a GTP-U port number, update the GTP-U port number to a wireless network transmission optimization (WNTO) port number before the processor adapts the second standard IP data packet to the corresponding second wireless transmission protocol packet, wherein the WNTO port number represents that the corresponding standard IP data packet has been optimized by compression.

2. The apparatus according to claim 1, further comprising:
a storage device;
wherein the processor is further configured to:
  if the first wireless transmission protocol packet carries user data, acquire a mapping relationship between first transmission network layer header information of the first wireless transmission protocol packet and quintuple information of the first standard IP data packet;
wherein the storage device is configured to store the mapping relationship;
wherein the processor is further configured to:
  after the receiver receives the second standard IP data packet sent by the NTO device and before the processor adapts the second standard IP data packet to the corresponding second wireless transmission protocol packet, determine, according to quintuple information of the second standard IP data packet and the mapping relationship, N pieces of first transmission network layer header information corresponding to the quintuple information of the second standard IP data packet;
  if the N pieces of the first transmission network layer header information comprise IP headers, User Datagram Protocol (UDP) headers, and general packet radio service technology GPRS Tunneling Protocol-User Plane (GTP-U) headers, and S identifiers of the GTP-U headers in the N pieces of first transmission network layer header information are 1, determine whether transmission network layer session information corresponding to the N pieces of first transmission network layer header information is stored, wherein the transmission network layer session information comprises a GTP-U serial number;
  if the storage device stores the transmission network layer session information corresponding to the N pieces of first transmission network layer header information, increase the GTP-U serial number in the transmission network layer session information corresponding to the N pieces of first transmission network layer header information by 1;
wherein the storage device is further configured to: if no transmission network layer session information corresponding to the N pieces of first transmission network header information is stored, store the transmission network layer session information corresponding to the N pieces of first transmission network layer header information, wherein the GTP-U serial number in the transmission network layer session information is a minimum serial number of GTP-U serial numbers the GTP-U headers in the N pieces of first transmission network layer header information; and wherein the processor is further configured to determine, according to the GTP-U serial number in the transmission network layer session information corresponding to the N pieces of first transmission network header information and the N pieces of first transmission network header information, transmission network layer header information corresponding to the second standard IP data packet.

3. The apparatus according to claim 1,
wherein the first wireless transmission protocol packet is a to-be-decompressed wireless transmission protocol packet;
wherein the receiver is further configured to receive the $m^{th}$ second standard IP data packet sent by the NTO device, wherein the $m^{th}$ second standard IP data packet is one standard IP data packet of M second standard IP data packets obtained after the NTO device processes the received first standard IP data packet, $1 \leq m \leq M$, and both m and M are integers; and
wherein the processor is further configured to adapt the $m^{th}$ second standard IP data packet to the corresponding second wireless transmission protocol packet.

4. The apparatus according to claim 3, wherein the apparatus further comprises:
a storage device,
wherein the processor is further configured to:
  if the first wireless transmission protocol packet carries user data, acquire a mapping relationship between first transmission network layer header information of the first wireless transmission protocol packet and quintuple information of the first standard IP data packet;
wherein the storage device is configured to store the mapping relationship;
wherein the processor is further configured to:
  after the receiver receives the $m^{th}$ second standard IP data packet sent by the NTO device and before the processor adapts the $m^{th}$ second standard IP data packet to the corresponding second wireless transmission protocol packet, determine, according to quintuple information of the $m^{th}$ second standard IP data packet and the mapping relationship, first transmission network layer header information corresponding to the quintuple information of the $m^{th}$ second standard IP data packet;
  if the first transmission network layer header information comprises an IP header, a UDP header, and a GTP-U header, and an S identifier of the GTP-U header in the first transmission network layer header information is 1, determine whether transmission network layer session information corresponding to the first transmission network layer header information is stored, wherein the transmission network layer session information comprises a GTP-U serial number;
  if the storage device stores the transmission network layer session information corresponding to the first transmission network header information, increase the GTP-U serial number in the transmission network layer session information corresponding to the first transmission network header information by 1;
wherein the storage device is further configured to: if no transmission network layer session information corresponding to the first transmission network header information is stored, store the transmission network layer session information corresponding to the first transmission network header information, wherein the GTP-U serial number in the transmission network layer session information is a GTP-U serial number of the GTP-U header in the first transmission network header information; and wherein the processor is further configured to determine, according to the GTP-U serial number in the transmission network layer session information corresponding to the first transmission network header information, and the first transmission network header information, transmission network layer header information corresponding to the $m^{th}$ second standard IP data packet.

5. The apparatus according to claim 1,
wherein the processor is further configured to:
if the first wireless transmission protocol packet does not carry user data, after the processor detects whether the first wireless transmission protocol packet carries user data, determine whether a total length of the first wireless transmission protocol packet exceeds a preset transmission length threshold of a data link layer;
if the total length of the first wireless transmission protocol packet exceeds the preset transmission length threshold, perform IP fragmentation on the first wireless transmission protocol packet; and
wherein the transmitter is further configured to send the first wireless transmission protocol packet on which IP fragmentation is performed.

6. The apparatus according to claim 1,
wherein the first transmission network layer header information of the first wireless transmission protocol packet comprises an IP header, a UDP header, and a GTP-U header; and
wherein the processor is further configured to:
detect whether an IP address of the transmission network layer IP header of the acquired wireless transmission protocol packet is within a preset IP address range;
if the IP address of the transmission network layer IP header is within the preset IP address range, determine whether IP fragmentation is performed on the wireless transmission protocol packet;
if IP fragmentation is performed on the wireless transmission protocol packet, perform IP fragment reassembly on the wireless transmission protocol packet on which IP fragmentation is performed;
detect whether a protocol type of the transmission network layer IP header is UDP;
if the protocol type of the transmission network layer IP header is UDP, detect whether a UDP destination port number of the transmission network layer UDP header is a GTP-U port number;
if the UDP destination port number is the GTP-U port number, detect whether a message field type of the transmission network layer GTP-U header is a GTP encapsulated user plane data unit G-PDU; and
if the message field type of the transmission network layer GTP-U header is the G-PDU, determine that the acquired wireless transmission protocol packet carries user data.

7. The apparatus according to claim 3, wherein the processor is further configured to:
if a destination port number of a UDP header in the transmission network layer header information corresponding to the $m^{th}$ second standard IP data packet is a WNTO port number, update the WNTO port number to a GTP-U port number before the processor adapts the $m^{th}$ second standard IP data packet to the corresponding second wireless transmission protocol packet, wherein the WNTO port number represents that the corresponding standard IP data packet has been optimized by compression.

8. The apparatus according to claim 7,
wherein the first transmission network layer header information of the first wireless transmission protocol packet comprises an IP header, a UDP header, and a GTP-U header; and
wherein the processor is further configured to:
detect whether an IP address of the transmission network layer IP header of the acquired wireless transmission protocol packet is within a preset IP address range;
if the IP address of the transmission network layer IP header is within the preset IP address range, determine whether IP fragmentation is performed on the wireless transmission protocol packet;
if IP fragmentation is performed on the wireless transmission protocol packet, perform IP fragment reassembly on the wireless transmission protocol packet on which IP fragmentation is performed;
detect whether a protocol type of the transmission network layer IP header is UDP;
if the protocol type of the transmission network layer IP header is UDP, detect whether a UDP destination port number of the transmission network layer UDP header is a WNTO port number; and
if the UDP destination port number is the WNTO port number, determine that the acquired wireless transmission protocol packet carries user data.

9. A protocol stack adaptation method, comprising:
acquiring a first wireless transmission protocol packet;
detecting, based on a first preset detection rule, whether the first wireless transmission protocol packet carries user data;
in response to detecting that the first wireless transmission protocol packet carries user data, adapting the first wireless transmission protocol packet to a corresponding first standard Internet Protocol (IP) data packet, wherein the first wireless transmission protocol packet is a to-be-compressed wireless transmission protocol packet;
sending the first standard IP data packet to a network transmission optimization (NTO) device;
receiving a second standard IP data packet sent by the NTO device, wherein the second standard IP data packet is obtained after the NTO device processes N received first standard IP data packets, N≥1, and N is an integer;
adapting the second standard IP data packet to a corresponding second wireless transmission protocol packet; and
before the adapting the second standard IP data packet to the corresponding second wireless transmission protocol packet, the method further comprises:
determining that a destination port number of a UDP header in transmission network layer header information corresponding to the second standard IP data packet is a GTP-U port number, updating the GTP-U port number to a wireless network transmission optimization (WNTO) port number, wherein the WNTO port number represents that the corresponding standard IP data packet has been optimized by compression.

10. The method according to claim 9, wherein the first wireless transmission protocol packet carries user data, and the method further comprises:
  acquiring and storing a mapping relationship between first transmission network layer header information of the first wireless transmission protocol packet and quintuple information of the first standard IP data packet; and
  after the receiving a second standard IP data packet sent by the NTO device and before the adapting the second standard IP data packet to a corresponding second wireless transmission protocol packet, the method further comprises:
    determining, according to quintuple information of the second standard IP data packet and the mapping relationship, N pieces of first transmission network layer header information corresponding to the quintuple information of the second standard IP data packet;
    if the N pieces of the first transmission network layer header information comprise IP headers, User Datagram Protocol (UDP) headers, and general packet radio service technology GPRS Tunneling Protocol-User Plane (GTP-U) headers, and S identifiers of the GTP-U headers in the N pieces of first transmission network layer header information are 1, determining whether transmission network layer session information corresponding to the N pieces of first transmission network layer header information is stored, wherein the transmission network layer session information comprises a GTP-U serial number;
    wherein if the transmission network layer session information corresponding to the N pieces of first transmission network layer header information is stored, increasing the GTP-U serial number in the transmission network layer session information corresponding to the N pieces of first transmission network layer header information by 1; or, wherein if no transmission network layer session information corresponding to the N pieces of first transmission network header information is stored, storing the transmission network layer session information corresponding to the N pieces of first transmission network layer header information, wherein the GTP-U serial number in the transmission network layer session information is a minimum serial number of GTP-U serial numbers of the GTP-U headers in the N pieces of first transmission network layer header information; and
    determining, according to the GTP-U serial number in the transmission network layer session information corresponding to the N pieces of first transmission network header information and the N pieces of first transmission network header information, transmission network layer header information corresponding to the second standard IP data packet.

11. The method according to claim 9,
  wherein the first wireless transmission protocol packet is a to-be-decompressed wireless transmission protocol packet;
  wherein the receiving the second standard IP data packet sent by the NTO device comprises:
    receiving the $m^{th}$ second standard IP data packet sent by the NTO device, wherein the $m^{th}$ second standard IP data packet is one standard IP data packet of M second standard IP data packets obtained after the NTO device processes the received first standard IP data packet, $1 \leq m \leq M$, and both m and M are integers; and
  wherein the adapting the second standard IP data packet to the corresponding second wireless transmission protocol packet comprises:
    adapting the $m^{th}$ second standard IP data packet to the corresponding second wireless transmission protocol packet.

12. The method according to claim 11, wherein the first wireless transmission protocol packet carries user data, and the method further comprises:
  acquiring and storing a mapping relationship between first transmission network layer header information of the first wireless transmission protocol packet and quintuple information of the first standard IP data packet; and
  after the receiving the $m^{th}$ second standard IP data packet sent by the NTO device and before the adapting the $m^{th}$ second standard IP data packet to the corresponding second wireless transmission protocol packet, the method further comprises:
    determining, according to quintuple information of the $m^{th}$ second standard IP data packet and the mapping relationship, first transmission network layer header information corresponding to the quintuple information of the $m^{th}$ second standard IP data packet;
    if the first transmission network layer header information comprises an IP header, a UDP header, and a GTP-U header, and an S identifier of the GTP-U header in the first transmission network layer header information is 1, determining whether transmission network layer session information corresponding to the first transmission network layer header information is stored, wherein the transmission network layer session information comprises a GTP-U serial number; wherein if the transmission network layer session information corresponding to the first transmission network header information is stored, increasing the GTP-U serial number in the transmission network layer session information corresponding to the first transmission network header information by 1; or, wherein if no transmission network layer session information corresponding to the first transmission network header information is stored, storing the transmission network layer session information corresponding to the first transmission network header information, wherein the GTP-U serial number in the transmission network layer session information is a GTP-U serial number of the GTP-U header in the first transmission network header information; and
    determining, according to the GTP-U serial number in the transmission network layer session information corresponding to the first transmission network header information, and the first transmission network header information, transmission network layer header information corresponding to the $m^{th}$ second standard IP data packet.

13. The method according to claim 9, wherein after the detecting whether the first wireless transmission protocol packet carries user data, the method further comprises:
  if the first wireless transmission protocol packet does not carry user data, determining whether a total length of the first wireless transmission protocol packet exceeds a preset transmission length threshold of a data link layer;

if the total length of the first wireless transmission protocol packet exceeds the preset transmission length threshold, performing IP fragmentation on the first wireless transmission protocol packet; and sending the first wireless transmission protocol packet on which IP fragmentation is performed.

14. The method according to claim 9, wherein the first transmission network layer header information of the first wireless transmission protocol packet comprises an IP header, a UDP header, and a GTP-U header; and wherein the detecting, based on the first preset detection rule, comprises:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a GTP-U port number;

if the UDP destination port number is the GTP-U port number, detecting whether a message field type of the transmission network layer GTP-U header is a GTP encapsulated user plane data unit G-PDU; and if the message field type of the transmission network layer GTP-U header is the G-PDU, determining that the acquired wireless transmission protocol packet carries user data.

15. The method according to claim 11, wherein before the adapting the $m^{th}$ second standard IP data packet to the corresponding second wireless transmission protocol packet, the method further comprises:

if a destination port number of a UDP header in the transmission network layer header information corresponding to the $m^{th}$ second standard IP data packet is a WNTO port number, updating the WNTO port number to a GTP-U port number, wherein the WNTO port number represents that the corresponding standard IP data packet has been optimized by compression.

16. The method according to claim 15, wherein the first transmission network layer header information of the first wireless transmission protocol packet comprises an IP header, a UDP header, and a GTP-U header; and wherein the detecting, based on the first preset detection rule, comprises:

detecting whether an IP address of the transmission network layer IP header of the acquired wireless transmission protocol packet is within a preset IP address range;

if the IP address of the transmission network layer IP header is within the preset IP address range, determining whether IP fragmentation is performed on the wireless transmission protocol packet;

if IP fragmentation is performed on the wireless transmission protocol packet, performing IP fragment reassembly on the wireless transmission protocol packet on which IP fragmentation is performed;

detecting whether a protocol type of the transmission network layer IP header is UDP;

if the protocol type of the transmission network layer IP header is UDP, detecting whether a UDP destination port number of the transmission network layer UDP header is a WNTO port number; and if the UDP destination port number is the WNTO port number, determining that the acquired wireless transmission protocol packet carries user data.

17. A protocol stack adaptation apparatus, comprising:

a processor;

a transmitter; and a receiver, wherein the processor is configured to:

acquire a first wireless transmission protocol packet;

detect, based on a first preset detection rule, whether the first wireless transmission protocol packet carries user data; and in response to detecting that the first wireless transmission protocol packet carries user data, adapt the first wireless transmission protocol packet to a corresponding first standard Internet Protocol (IP) data packet, wherein the first wireless transmission protocol packet is a to-be-decompressed wireless transmission protocol packet;

wherein the transmitter is configured to send the first standard IP data packet to a network transmission optimization (NTO) device;

wherein the receiver is configured to receive a second standard IP data packet sent by the NTO device;

wherein the processor is further configured to adapt the second standard IP data packet to a corresponding second wireless transmission protocol packet;

wherein the receiver is further configured to receive the $m^{th}$ second standard IP data packet sent by the NTO device, wherein the $m^{th}$ second standard IP data packet is one standard IP data packet of M second standard IP data packets obtained after the NTO device processes the received first standard IP data packet, $1 \leq m \leq M$, and both m and M are integers; and wherein the processor is further configured to adapt the $m^{th}$ second standard IP data packet to the corresponding second wireless transmission protocol packet.

* * * * *